(12) United States Patent
Arroyo et al.

(10) Patent No.: US 7,975,295 B2
(45) Date of Patent: *Jul. 5, 2011

(54) ASSOCIATING SECURITY INFORMATION WITH INFORMATION OBJECTS

(75) Inventors: Diana J. Arroyo, Austin, TX (US); George R. Blakley, III, Round Rock, TX (US); Damir A. Jamsek, Austin, TX (US); Sridhar R. Muppidi, Austin, TX (US); Kimberly D. Simon, Austin, TX (US); Ronald B. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 12/130,027

(22) Filed: May 30, 2008

(65) Prior Publication Data

US 2008/0229412 A1  Sep. 18, 2008

Related U.S. Application Data

(63) Continuation of application No. 11/304,971, filed on Dec. 15, 2005, now Pat. No. 7,647,630.

(51) Int. Cl.
*G06F 11/00* (2006.01)
(52) U.S. Cl. .......... 726/21; 713/176; 713/170; 713/166; 713/167; 726/4
(58) Field of Classification Search .......... None
See application file for complete search history.

(56) References Cited

U.S. PATENT DOCUMENTS

| 5,249,265 A | 9/1993 | Liang |
| 5,765,153 A | 6/1998 | Benantar et al. |
| 5,845,068 A | 12/1998 | Winiger |
| 5,991,877 A | 11/1999 | Luckenbaugh |

(Continued)

FOREIGN PATENT DOCUMENTS

EP    0 605 106 A1    7/1994

(Continued)

OTHER PUBLICATIONS

Carpenter et al., "Abstract interdomain security assertions: A basis for extra-grid virtual organizations", IBM Systems Journal, vol. 43, No. 4, 2004, pp. 689-701.

(Continued)

*Primary Examiner* — Nasser Moazzami
*Assistant Examiner* — Fikremariam Yalew
(74) *Attorney, Agent, or Firm* — Stephen R. Tkacs; Stephen J. Walder, Jr.; Jeffrey S. LaBaw

(57) ABSTRACT

A hash key is generated based on an information object and a lookup operation is performed in a hash table based on the hash key. A determination is made whether an entry in the hash table at an index corresponding to the hash key identifies a labelset for the information object. A labelset, identifying a sensitivity of the information object, is stored in the entry at the index corresponding to the hash key for the information object if a labelset for the information object is not identified in the entry in the hash table. Information flows involving the information object are authorized based on a lookup of the labelset associated with the information object in the hash table. The hash table may be a multidimensional hash table.

25 Claims, 8 Drawing Sheets

U.S. PATENT DOCUMENTS

| | | | |
|---|---|---|---|
| 6,178,508 B1 | 1/2001 | Kaufman | |
| 6,192,361 B1 | 2/2001 | Huang | |
| 6,292,900 B1 | 9/2001 | Ngo et al. | |
| 6,324,637 B1 * | 11/2001 | Hamilton | 711/216 |
| 6,324,647 B1 | 11/2001 | Bowman-Amuah | |
| 6,449,613 B1 | 9/2002 | Egolf et al. | |
| 6,490,626 B1 | 12/2002 | Edwards et al. | |
| 6,523,067 B2 | 2/2003 | Mi et al. | |
| 6,766,314 B2 | 7/2004 | Burnett | |
| 6,792,424 B1 | 9/2004 | Burns et al. | |
| 6,854,016 B1 | 2/2005 | Kraenzel et al. | |
| 6,912,528 B2 | 6/2005 | Homer | |
| 6,928,439 B2 | 8/2005 | Satoh | |
| 7,107,610 B2 * | 9/2006 | Lortz | 726/4 |
| 7,340,469 B1 | 3/2008 | Alghathbar et al. | |
| 7,512,792 B2 | 3/2009 | Arroyo et al. | |
| 7,574,409 B2 * | 8/2009 | Patinkin | 706/12 |
| 7,647,630 B2 | 1/2010 | Arroyo et al. | |
| 7,793,100 B2 | 9/2010 | Arroyo et al. | |
| 2002/0035635 A1 | 3/2002 | Holden et al. | |
| 2002/0099952 A1 | 7/2002 | Lambert et al. | |
| 2003/0023954 A1 | 1/2003 | Wilkinson et al. | |
| 2004/0148521 A1 | 7/2004 | Cohen et al. | |
| 2006/0053285 A1 * | 3/2006 | Kimmel et al. | 713/166 |
| 2007/0143601 A1 | 6/2007 | Arroyo et al. | |
| 2007/0143604 A1 | 6/2007 | Arroyo et al. | |
| 2007/0204044 A1 | 8/2007 | Rice et al. | |
| 2008/0229413 A1 | 5/2008 | Arroyo et al. | |
| 2009/0119507 A1 | 5/2009 | Arroyo et al. | |

FOREIGN PATENT DOCUMENTS

| | | |
|---|---|---|
| EP | 0 849 680 A2 | 6/1998 |
| JP | 10-326256 | 12/1998 |
| JP | 2000138711 A | 5/2000 |
| JP | 2003179628 A | 6/2003 |

OTHER PUBLICATIONS

Hess et al., "Content-Triggered Trust Negotiation", ACM Transactions on Information and System Security, vol. 7, No. 3, Aug. 2004, pp. 428-456.

Crampton, Jason, "A Reference Monitor for Workflow Systems with Constrained Task Execution", SACMAT '05, Jun. 1-3, 2005, Stockholm, Sweden, pp. 38-47.

Gladney, H.M., "Access Control for Large Collections", ACM Transactions on Information Systems, vol. 15, No. 2, Apr. 1997, pp. 154-194.

Kon et al., "Monitoring, Security, and Dynamic Configuration with the dynamicTAO Reflective ORB*", J. Sventek and G. Coulson (Eds.): Middleware 2000, LNCS 1795, pp. 121-143.

Feustel et al., "The DGSA: Unmet Information Security Challenges for Operating System Designers", 1997, pp. 3-22.

Lin et al., "Integration of DCE and Local Registries: Design Approaches", 1st Conf.—Computer & Comm. Security '93-Nov. 1993, VA, USA, pp. 165-170.

Lin et al., "Defining Autonomic Computing: A Software Engineering Perspective", Proc. 2005 Australian Software Engineering Conference (ASEWC'05), 2005, 10 pages.

Dionisio et al., "A Unified Data Model for Representing Multimedia, Timeline, and Simulation Data", IEEE Transactions on Knowledge and Data Engineering, vol. 10, No. 5, Sep./Oct. 1998, pp. 746-767.

Kang et al., "An Integrated Access Control in Heterogeneous Distributed Database Systems", Microprocessing & Microprogramming, vol. 35, No. 1-5, Sep. 1992, pp. 429-436.

Roe et al., "Integrating Cryptography in the Trusted Computing Base", Proc. of the Sixth Annual Computer Security Applications Conference (Cat. No. 90TH0351-7), 1990, pp. 50-56.

Shin et al., "File protection with operating system security", Abstract, Korea Information Science Society Review, vol. 7, No. 5, 1989, 1 page.

Denning et al., "Views for Multilevel Database Security", IEEE Transactions on Software Engineering, vol. SE-13, No. 2, Feb. 1987, pp. 129-140.

Garvey et al., "ASD_VIEWS", IEEE, Proceedings of the 1988 IEEE Symposium on Security and Privacy, Apr. 18-21, 1988, pp. 85-95.

USPTO U.S. Appl. No. 11/304,853, Image File Wrapper printed on Oct. 21, 2010, 3 pages.

USPTO U.S. Appl. No. 11/304,933, Image File Wrapper printed on Oct. 21, 2010, 3 pages.

USPTO U.S. Appl. No. 11/304,971, Image File Wrapper printed on Oct. 21, 2010, 4 pages.

USPTO U.S. Appl. No. 12/130,252, Image File Wrapper printed on Jan. 4, 2011, 4 pages.

USPTO U.S. Appl. No. 12/350,327, Image File Wrapper printed on Oct. 21, 2010, 4 pages.

* cited by examiner

```
<labelset> ::= <version> : <count> : <labellist>
<version> ::= <major> . <minor>
<major> ::= {1..(2^64-1)}
<minor> ::= {0..(2^64-1)}
<count> ::= {ordinal > 0}
<labellist> ::= <label>*
<label> ::= <policy_type> : <value>
<policy_type> ::= <version> : {1..(2^64-1)}
<value> ::= {1..(2^64-1)}
```

*FIG. 6*

```
<labelset>
        <version>
                <major>1</major>
                <minor>0</minor>
        </version>
        <count>1</count>   ← 752
        <labellist>
                <label>
                        <policy_type>1</policy_type>
                        <version>
                                <major>1</major>
                                <minor>0</minor>
                        </version>
                        <value>1</value>
                </label>                   772
        </labellist>
</labelset>
```

750 points to the whole block; 760 brackets the labellist; 770 brackets the label.

*FIG. 7B*

```
<labelset>
    <version>
        <major>1</major>
        <minor>0</minor>
    </version>
    <count>3</count>
    <labellist>
        <label>
            <policy_type>1</policy_type>
            <version>
                <major>1</major>
                <minor>0</minor>
            </version>
            <value>3</value>
        </label>
        <label>
            <policy_type>1</policy_type>
            <version>
                <major>1</major>
                <minor>0</minor>
            </version>
            <value>2</value>
        </label>
        <label>
            <policy_type>1</policy_type>
            <version>
                <major>1</major>
                <minor>0</minor>
            </version>
            <value>1</value>
        </label>
    </labellist>
</labelset>
```

*FIG. 7A*

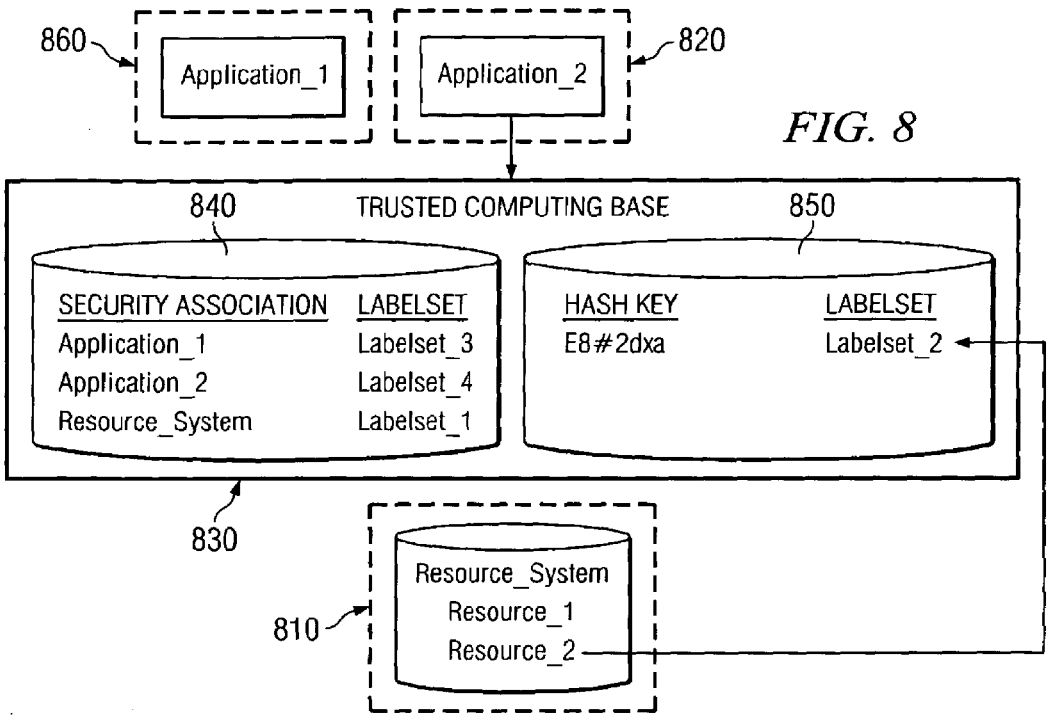
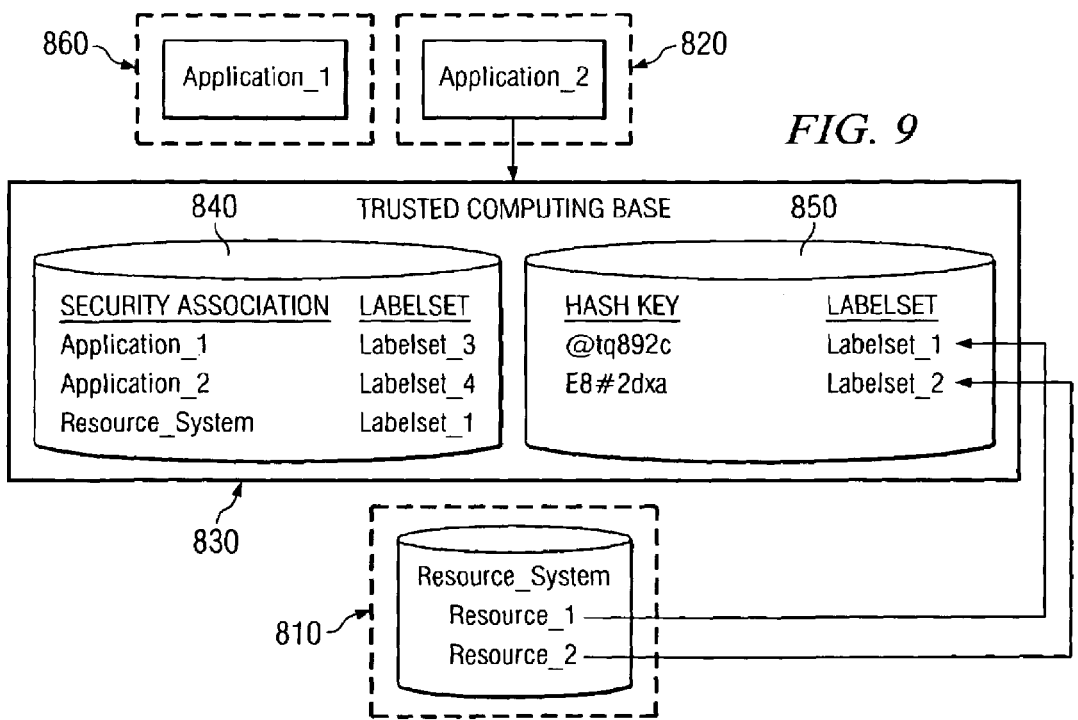

ASSOCIATING SECURITY INFORMATION WITH INFORMATION OBJECTS

This application is a continuation of application Ser. No. 11/304,971, filed Dec. 15, 2005, status pending.

BACKGROUND

1. Technical Field

The present invention relates generally to an improved data processing system and method. More specifically, the present invention is directed to a system and method for associating security information with information objects in a data processing system.

2. Description of Related Art

A reference monitor is an authorization and enforcement mechanism for authorizing a source to perform a particular action on a target. Many reference monitors make use of access control lists (ACLs) for performing such authorization. These ACLs identify, for each source, the targets that the source may access and the particular types of access that source is authorized to have, i.e. what actions the source may perform on the target.

Most modern reference monitors and security systems make authorization decisions by comparing "subject" security attributes and "target" security attributes against a set of security policy rules. Different data types are often assigned to the subject and target security attributes. One example illustrating these different data types is provided in the ISO 10181-3 Access Control Framework described at www.opengroup.org/onlinepubs/009609199/chap3.htm#tagfcjh_2. In this exemplary architecture, four different roles, or data types are provided, i.e. initiators (sources), targets, access control enforcement functions, and access control decision functions. This type difference between subject security attributes and target security attributes adds unnecessary complexity to the security policy evaluation process in that each possible combination of subject and target security attributes must be provided with a security policy rule in order to be evaluated correctly during runtime.

Additionally, the target security attribute data types are typically based on the set of operations which may be performed on the target resource. Thus, the target security attribute type creates an unnecessary linkage between the structure of the application which manages target resources and the structure of the security policy evaluation subsystem. This in turn creates unnecessary complexity in the security policy evaluation subsystem since the security policy must now take into consideration the semantics of data manipulation by the applications and the semantics of security policy evaluation.

Moreover, distinguishing the data types of subject security attributes and target security attributes creates an asymmetry in the security policy which restricts the security evaluation subsystem to control transfers from the subject (source) to the target, i.e. the object that will be receiving information, but does not allow it to control transfers from the target to the source. In other words, separate policies must be established for each type of transfer between each pair of subject and target, thereby leading to even more complexity of the security policy evaluation subsystem.

For example, assume that there are two Objects A and B. In order to cover all possible transfers between Objects A and B, four policies must be established and evaluated when controlling transfers of information: (1) A can (or cannot) write to B, (2) A can (or cannot) read from B, (3) B can (or cannot) read from A, and (4) B can (or cannot) write to A.

Many different mechanisms have been devised for controlling the transfer of information between elements of a data processing system. For example, in U.S. Pat. No. 6,766,314 issued to Rodney Burnett, entitled "Method for Attachment and Recognition of External Authorization Policy on File System Resources," an external security database containing auxiliary attributes for objects in a file system is generated. During a file access attempt, an identifier of the file is matched against a set of protected files in the security database. If the file is not in the database, then there is no protection of the file and the requester is allowed to access the file. If there is a match in the database, the file is protected and a determination as to whether a requester will be allowed to access the file is made based on a set of security rules defined in the external security attribute.

With the mechanism of U.S. Pat. No. 6,766,314, a resource manager comprises components for retrieving a security policy, components for intervening in access to the files to be protected, and components collecting access conditions such as the accessing user and the attempted action. Based on the security policy, the file being accessed, and the access conditions, a decision is rendered regarding authorization to access the file.

Thus, in the mechanism of U.S. Pat. No. 6,766,314, authorization to access a file is tied to the identity of the user and the action being attempted. Thus, the actions being performed are tied to the entities performing the actions and the file being accessed. As mentioned above, this creates an unnecessary linkage between the structure of the application which manages the files and the structure of the security policy evaluation subsystem.

A similar mechanism is described in U.S. Pat. No. 5,765,153. In U.S. Pat. No. 5,765,153, a reference monitor is provided which enforces policies based on subject identities, object names, and actions defined by the interface of the protected object. Again, by basing authorization decisions on the identities of the entities and the types of actions being performed on one identified entity by another identified entity, an unnecessary linkage is generated that complicates the implementation of a security policy evaluation subsystem.

SUMMARY

In view of the above, it would be beneficial to have a mechanism for simplifying the implementation of a security structure with regard to transfers of information between elements of a data processing system. In particular, it would be beneficial to have a system and method for controlling information flows by applying security policies to a common security attribute type such that the actions involved in the transfers of information do not complicate the application of the security policies. The illustrative embodiments provide such a system and method.

In one illustrative embodiment, a method for authorizing information flows between devices of the data processing system is provided in which security information is associated information objects. The method may comprise generating a hash key based on an information object, performing a lookup operation in a hash table based on the hash key, and determining if an entry in the hash table at an index corresponding to the hash key identifies a labelset for the information object. The method may further comprise storing a labelset, identifying a sensitivity of the information object, in the entry at the index corresponding to the hash key for the information object if a labelset for the information object is not identified in the entry in the hash table. The method may further comprise authorizing information flows involving the information object based on a lookup of the labelset associated with the information object in the hash table.

The hash table may be a multidimensional hash table and the hash key may comprise a plurality of hash keys generated by a plurality of hash functions, at least one hash function and hash key for each dimension of the multidimensional hash table. The hash key may be generated using at least one hash function on content of the information object. The information object may be a computer file. The hash table may be stored in a trusted computing base which is separate from a source of the information object.

Authorizing information flows involving the information object based on a lookup of the labelset associated with the information object in the hash table may comprise receiving a request for authorization of an information flow involving the information object from a first device to a second device and retrieving contents of the information object from a source of the information object. Authorizing information flows may further comprise generating a hash key based on the contents of the information object, performing a lookup operation in the hash table based on the hash key to identify a labelset associated with the information object, and performing one or more authorization operation based on the labelset associated with the information object.

Performing one or more authorization operations may comprise comparing the labelset associated with the information object and a labelset of a source of the information object with a labelset associated with a target of the information flow. Comparing the labelset associated with the information object and the labelset of the source with a labelset associated with a target of the information flow may comprise performing at least one set theory operation on the labelsets. The at least one set theory operation may be performed by at least one security policy module identified in the labelset associated with the information object and the labelset associated with the target of the information flow. Results generated by each of the at least one security policy modules may be combined to generate a single result indicating whether the information flow is authorized.

Storing a labelset, identifying a sensitivity of the information object, in the entry at the index corresponding to the hash key for the information object may comprise storing a labelset associated with a source of the information object in the entry in association with the information object. The labelset may comprise a labellist element providing one or more labels of the labelset. The labels in the labellist may be comprised of a policy type and a value. The policy type may identify a security policy to be applied to the labelset and the value may identify a value to be used in evaluating the security policy identified by the policy type. Each labelset may further comprise a version element indicating a version of the labelset and a count element indicating a number of labels included in the labelset.

In another illustrative embodiment, a computer program product comprising a computer usable medium including a computer readable program is provided. The computer readable program, when executed on a computing device, may cause the computing device to generate a hash key based on an information object, perform a lookup operation in a hash table based on the hash key, and determine if an entry in the hash table at an index corresponding to the hash key identifies a labelset for the information object. The computer readable program may further cause the computing device to store a labelset, identifying a sensitivity of the information object, in the entry at the index corresponding to the hash key for the information object if a labelset for the information object is not identified in the entry in the hash table. The computer readable program may further cause the computing device to authorize information flows involving the information object based on a lookup of the labelset associated with the information object in the hash table. The computer readable program may also cause the computing device to perform the various other operations outlined above with regard to the method illustrative embodiment.

In yet another illustrative embodiment, a system or apparatus for authorizing information flows between devices of the data processing system is provided. The system or apparatus may comprise an information flow mediator and a labelset storage device coupled to the information flow mediator. The information flow mediator may generate a hash key based on an information object, perform a lookup operation in a hash table stored in the labelset storage device based on the hash key, and may determine if an entry in the hash table at an index corresponding to the hash key identifies a labelset for the information object. The information flow mediator may further store a labelset, identifying a sensitivity of the information object, in the entry at the index corresponding to the hash key for the information object if a labelset for the information object is not identified in the entry in the hash table. The information flow mediator may further authorize information flows involving the information object based on a lookup of the labelset associated with the information object in the hash table.

The information flow mediator may authorize information flows involving the information object based on a lookup of the labelset associated with the information object in the hash table by receiving a request for authorization of an information flow involving the information object from a first device to a second device, retrieving contents of the information object from a source of the information object, generating a hash key based on the contents of the information object, performing a lookup operation in the hash table based on the hash key to identify a labelset associated with the information object, and performing one or more authorization operation based on the labelset associated with the information object.

The information flow mediator may perform one or more authorization operation by comparing the labelset associated with the information object and a labelset of a source of the information object with a labelset associated with a target of the information flow. The information flow mediator may compare the labelset associated with the information object and the labelset of the source with a labelset associated with a target of the information flow by performing at least one set theory operation on the labelsets.

The at least one set theory operation may be performed by at least one security policy module identified in the labelset associated with the information object and the labelset associated with the target of the information flow. Results generated by each of the at least one security policy module may be combined to generate a single result indicating whether the information flow is authorized.

The information flow mediator may store a labelset in the entry at the index corresponding to the hash key for the information object by storing a labelset associated with a source of the information object in the entry in association with the information object.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is an exemplary diagram illustrating an exemplary definition of a labelset in accordance with one illustrative embodiment;

FIG. 7A is an exemplary diagram of a first labelset in accordance with one illustrative embodiment;

FIG. 7B is an exemplary diagram of a second labelset in accordance with one illustrative embodiment;

FIG. 8 is an exemplary diagram illustrating a first example situation in which a hash table is used for associating labelsets with resources to determine whether to grant or deny an information flow request in accordance with one illustrative embodiment;

FIG. 9 is an exemplary diagram illustrating a second example situation in which a hash table is used for associating labelsets with resources to determine whether to grant or deny an information flow request in accordance with one illustrative embodiment;

DETAILED DESCRIPTION OF THE PREFERRED EMBODIMENTS

Figure 1:
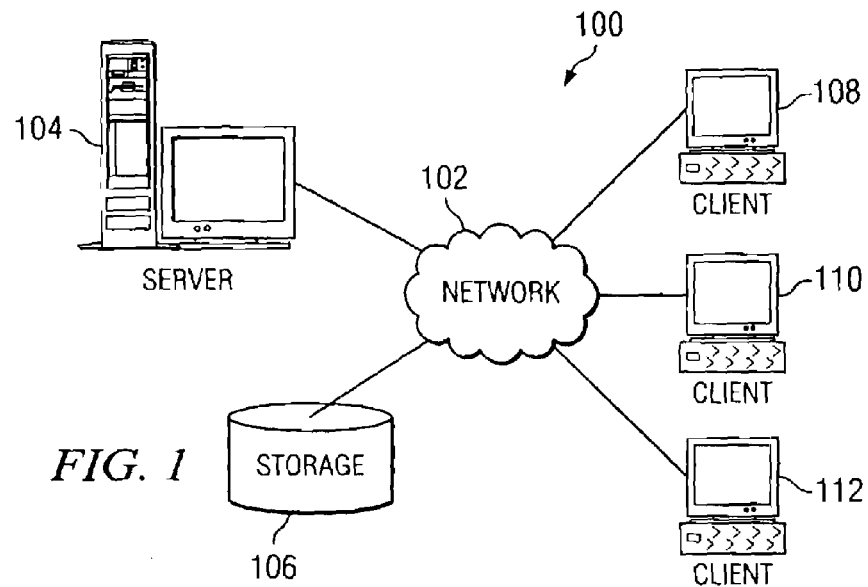
FIG. 1 is an exemplary block diagram of a distributed, or network, data processing system in which exemplary aspects of the illustrative embodiments may be implemented.
Figure 2:
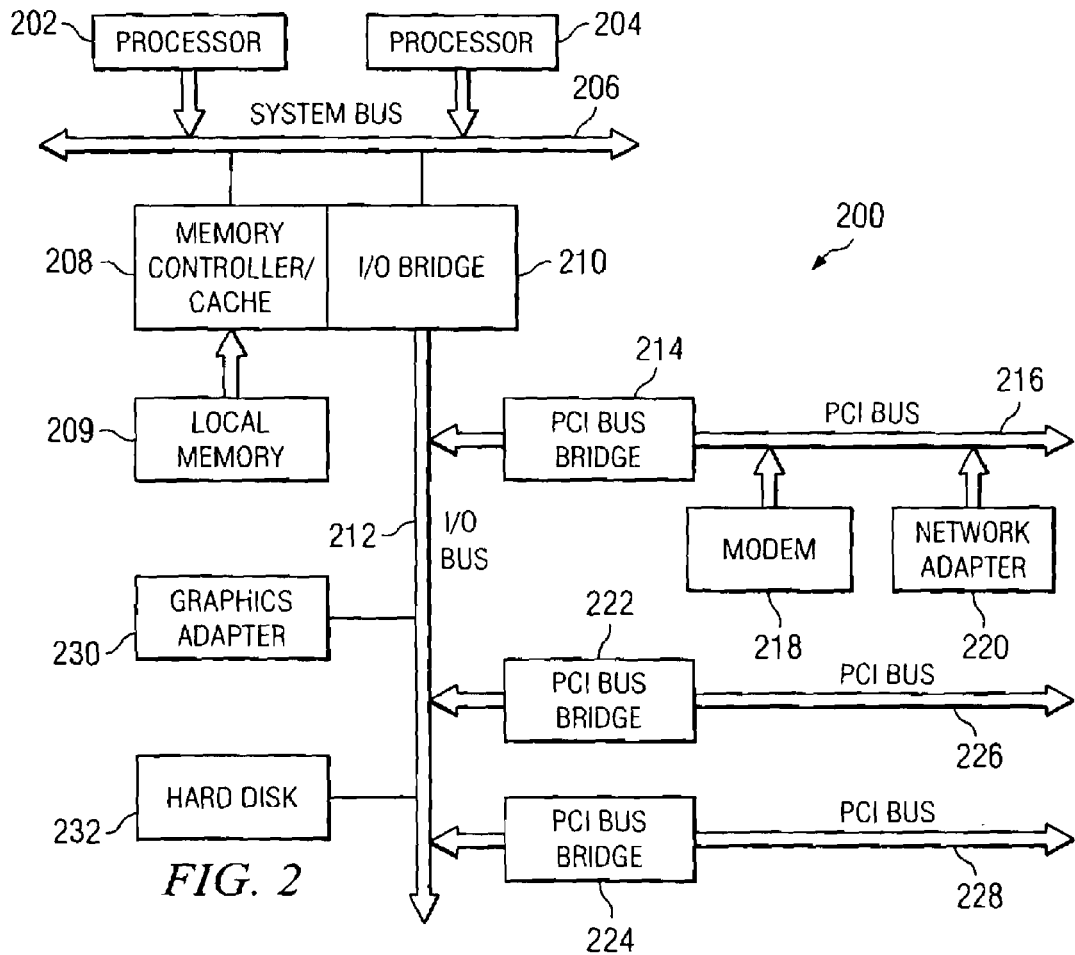
FIG. 2 is an exemplary block diagram of a server computing device in which exemplary aspects of the illustrative embodiments may be implemented.
Figure 3:
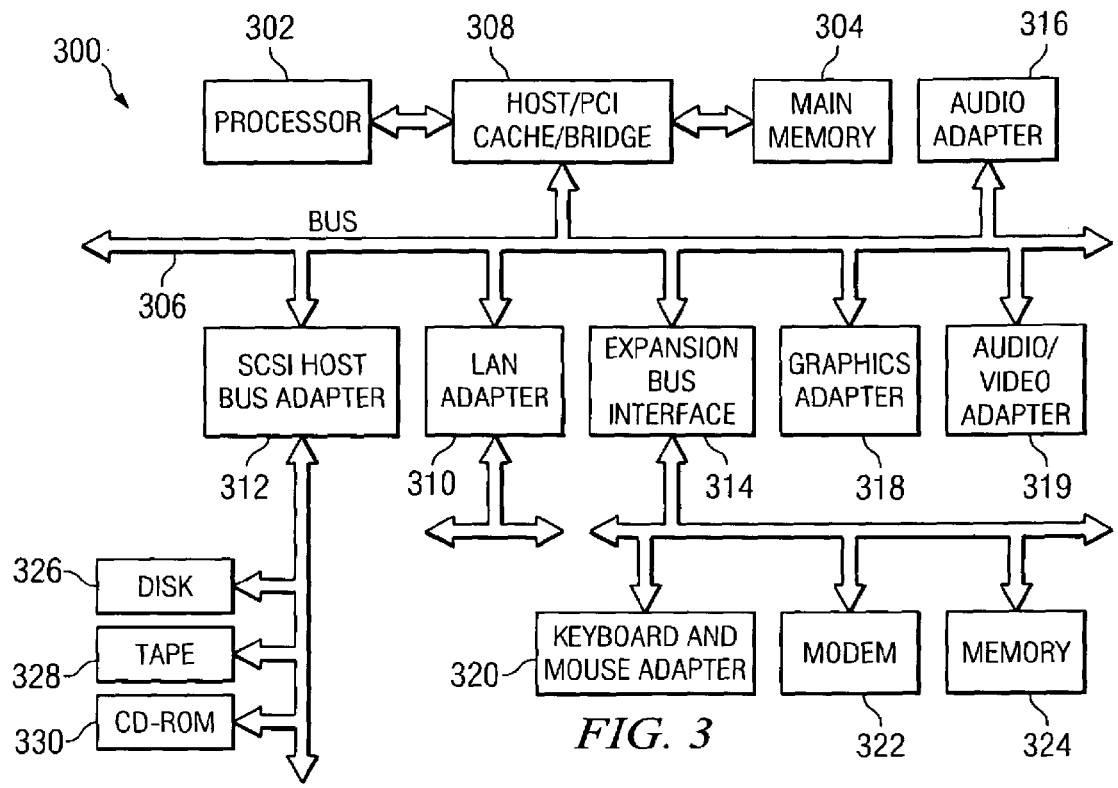
FIG. 3 is an exemplary block diagram of a client computing device in which exemplary aspects of the illustrative embodiments may be implemented.

The illustrative embodiments are directed to mechanisms for improving the implementation of security in the flow of information between a source and a target. The mechanisms of the illustrative embodiments may be implemented on information flows that occur entirely within a single computing device or may be implemented on information flows between computing devices, such as in a distributed or networked data processing system. Therefore, FIGS. 1-3 hereafter are provided as examples of data processing environments in which the mechanisms of the illustrative embodiments may be implemented. FIGS. 1-3 are only illustrative and are not intended to state or imply any limitation with regard to the types of data processing environments in which the mechanisms of the illustrative embodiments may be implemented. To the contrary, many modifications may be made to the depicted data processing environments without departing from the spirit and scope of the present invention.

With reference now to the figures, FIG. 1 depicts a pictorial representation of a network of data processing systems in which exemplary aspects of the illustrative embodiments may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in which exemplary aspects of the illustrative embodiments may be implemented. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which exemplary aspects of the illustrative embodiments may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (USA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards.

In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The illustrative embodiments provide mechanisms for controlling the flow of information between elements of computing devices or networks of computing devices. This control of information flow may be performed completely within a single computing system, such as completely between elements within server 104 or elements within client computing devices 108-112 in FIG. 1. For example, the mechanisms of the illustrative embodiments may be used to control the flow of information between one or more applications running on processor 202 and one or more applications running on processor 204 in FIG. 2, or even one application running on processor 302 and another application running on processor 302 in FIG. 3. Furthermore, the mechanisms of the illustrative embodiments may control information flow between one or more applications and other resources, or directly between one or more resources in the computing device, e.g., portions of memory, an I/O controller, a network interface, etc.

The mechanism of the illustrative embodiments may also be used to control information flow between computing devices or systems in a larger distributed or network data processing environment, such as that shown in FIG. 1. Thus, for example, the mechanism of the illustrative embodiment may be provided in a server, such as server 104, and used to control information flow between one client computing device 108 and the other client computing devices 110, 112 or even storage system 106. In short, the mechanisms of the illustrative embodiments may be used to control information flow between any two software and/or hardware elements of one or more data processing devices.

With the mechanisms of the illustrative embodiments, applications, devices, systems, and other software and/or hardware entities of a data processing system are associated with protected environments, also referred to as "partitions," that are identified by unique security associations (SAs). The SAs are associated with security information data structures that identify the security policies to be applied to the information flows into and out of the entities as well as the sensitivity of the items of information that may be maintained in each of the entities.

In the illustrative embodiments, these security information data structures are provided as labelsets, although the present invention is not limited to such representations of security information. To the contrary, any representation for identifying which security policies are to be applied to the information flows may be used without departing from the spirit and scope of the present invention.

In addition, items of information, i.e. resources, may be associated with labelsets using a hash table data structure. A hash key is generated based on the contents of the resource. The hash key is used as an index into the hash table data structure to thereby identify an entry having a labelset that is associated with the resource.

The labelsets generated by the illustrative embodiments describe information only in terms of sensitivity and not in terms of the operations which are used to transform or transmit the information. This separation of concerns enables the implementation of a very simple policy decision mechanism by decoupling the semantics of security policy evaluation from the semantics of data manipulation by applications, devices, systems and other entities in the data processing system. Moreover, the use of the labelsets permits security policies and rules to be defined in terms of set theory operations, e.g., set union, intersection, and complement operations. The security policies and rules are not concerned with the particular actions being performed in an information flow, but merely the sensitivities of the information that may be maintained by the entities involved and the sensitivity of the information that is the subject of the information flow.

In handling an information flow request from an entity in the data processing system, the labelsets for the source and target protected environments may be provided to a policy framework which parses the labelsets to identify which security policies are referenced by the labelsets. Policy modules associated with the identified security policies may then be provided with the labelsets so as to evaluate the security policies based on the labelsets for the source and target protected environments. Each policy module may generate a decision as to whether an information flow request is to be granted, denied, or no decision can be made, based on the application of its security policy to the labelsets. The decisions may be made, for example, by comparing the labelset of the source protected environment to the labelset of the target protected environment using set theory operations.

The various decisions may be provided to a decision combinator which combines the various decisions using combinator rules and generates a single decision as to whether the information flow request should be granted or not. If the information flow request is to be granted, then the information flow is permitted between the source and the target protected environments. If the information flow request is to be denied, the flow of the resource to the target protected environment is blocked and an error message may be returned.

There are two types of information flows that may be granted, "stream" and "resource." If a "resource" information flow is granted, then a single transfer of the resource is granted between the source and target protected environments. If a "stream" information flow is granted, then information is allowed to flow from the source to the target as a stream until the flow is denied, e.g., because something in the reference monitor has changed which causes the information flow to be denied, or the stream is closed. For example, if the target protected environment has updated its labelset and the new labelset evaluates to a denial of the information flow, then the stream may be denied after it is initially granted.

In one illustrative embodiment, the resources may be associated with labelsets using a hash table data structure using a hash of the contents of the resource as an index into the hash table data structure. In such a case, when an information flow request is received, the resource that is the subject of the information flow may be retrieved from a source protected environment and hashed using one or more hash functions. For added security, a multi-dimensional hash and hash table data structure may be utilized. The generated hash value may be used to perform a lookup of a labelset corresponding to the resource in a hash table data structure. If a valid entry is found in the hash table data structure based on the hash value, the corresponding labelset is retrieved and used with the security policies. In one illustrative embodiment, the retrieved labelset for the resource may be combined with the labelset for the source protected environment to generate an effective labelset which is used to evaluate against a labelset for the target protected environment. If a valid entry is not found, or if a "stream" information flow is being requested, then the labelset for the source protected environment may be used and may be stored in the hash table in association with the generated hash value.

With the mechanisms of the illustrative embodiments, labelsets are maintained completely within the reference monitor and thus, are not susceptible to unintentional or malicious alteration. The labelsets also provide a mechanism for eliminating the semantics of data manipulation from security considerations and allow security considerations to be performed based on sensitivities of the protected environments and resources involved in the information flow. As a result, source and target protected environments and resources may all make use of a common security attribute, i.e. the labelsets, for security policy evaluations, thereby reducing the complexity in the creation and use of security policies and rules. The labelsets also permit the use of set theory operations to perform security policy evaluations, thereby again simplifying the security policies and rules. Moreover, the labelsets may be associated with resources using a multidimensional hash data structure, thereby reducing the possibility of unintentional or malicious alteration of labelsets and reducing the possibility of hash collisions.

Overall Architecture

Figure 4:
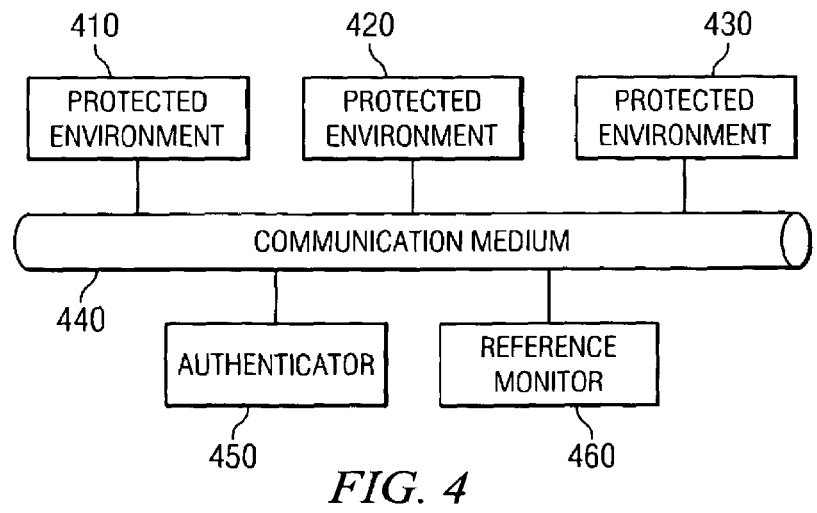
FIG. 4 is an exemplary diagram of an architecture in accordance with an illustrative embodiment.

The mechanisms of the illustrative embodiments make use of an architecture in which applications/resources are associated with protected environments such that information flow between protected environments is controlled in accordance with established security information data structures that identify security policies to be applied to information flows, e.g., labelsets. FIG. 4 is an exemplary block diagram depicting an architecture 400 in accordance with one illustrative embodiment. As shown in FIG. 4, the architecture 400 includes a plurality of protected environments 410-430, also referred to as "partitions," which may communicate with one another via the communications medium 440. An authenticator 450 and a reference monitor 460 are also provided in the depicted architecture.

The protected environments 410-430, or "partitions," may be comprised of one or more applications, one or more data processing devices, one or more data processing systems, one or more data processing device resources, or the like. In one illustrative embodiment, each existing application, device, resource, or system is associated with a separate protected environment or "partition," which acts as a proxy for communication with the reference monitor 460. The protected environments 410-430 are logical representations of the applications, devices, systems and/or resources in the architecture 400. These logical representations are maintained in the reference monitor 460 and are used, along with the other mechanisms of the illustrative embodiment, to govern the interaction of one protected environment with another with regard to information flow.

The reference monitor 460 mediates all communications between the protected environments 410-430. The communication medium 440 ensures that this mediation is performed on all communications between the protected environments by refusing to route communications directly from one protected environment to another and instead requiring that all communications flow through the reference monitor 460. In order to ensure that all communications flow through the reference monitor 460, routing mechanisms may be provided in the communication medium 440 that redirect communications from being routed to the target protected environment to the reference monitor 460.

The communication medium 440 may comprise any type of communication infrastructure, protocols, and the like. For example, the communication medium 440 may comprise buses, routers, networks, buffers, storage devices, addressing mechanisms, etc. and protocols including TCP/IP, SCSI, PCI, and the like. Regardless of the particular infrastructure or protocols used, the communication medium 440 is configured such that all communications out of a protected environment 410-430 first flow through the reference monitor 460 before being routed to the target protected environment 410-430 of the communication.

For example, in a networked environment, all protected environments 410-430 communicate through the communication medium 440 which performs the routing of network traffic. In a simple illustrative embodiment, a router may be used to route traffic from one protected environment 410-430 to another. To ensure all communications are mediated by the resource monitor 460, the router may be configured to restrict all incoming network traffic to be forwarded to the reference monitor 460 and all outgoing traffic can only come from the reference monitor 460.

Any entities in the protected environments 410-430 that need to communicate with another protected environment 410-430 must submit requests to communicate to the reference monitor 460 for authorization. Thus, for a single direction of information flow, a source of the communication must submit an information flow request to the reference monitor 460 requesting to communicate with the target of the communication. For a bi-directional information flow, both the source and the target (which will act as the source in the reverse direction) must submit information flow requests to the reference monitor 460.

This requirement for both entities to submit information flow requests in a bi-directional communication is based on the fact that the illustrative embodiment is directed to controlling the flow of information, not particular actions being performed. Thus, while a first entity may be authorized to send information to a second entity, that second entity may not be authorized to send information back to the first entity. In other words, the authorization of one direction of information flow does not necessarily mean that a reverse direction of information flow is also authorized.

The reference monitor 460 may make use of labelsets associated with the protected environments 410-430 to determine which directions of information flow between protected environments are permitted and which are not. These labelsets are not permitted to be accessed outside of the trusted base of the reference monitor 460. Thus, the labelsets are not provided to the protected environments 410-430.

The authenticator 450, in response to authentication assertions submitted by applications, devices, systems, and other types of "entities" of protected environments 410-430, performs authentication on the entities of the protected environment 410-430 to verify that the entities that will later submit information flow requests to the reference monitor 460 are authorized entities of a verified protected environment 410-430. Such authentication may take the form of password authentication, certificate authentication, or any other known authentication mechanism. The authentication assertion may be made by an entity, for example, at an initialization time of the entity, upon recovery of the entity after a failure, or the like.

Upon the authenticator 450 verifying the assertion of the entity in the protected environment 410-430, the authenticator 450 issues a token for the requestor. The requester may then use this token to request the reference monitor 460 to generate and associate a labelset for the protected environment 410-430.

Based on the token issued by the authenticator 450, the reference monitor 460 determines which labelset to associate with the protected environment. For example, the reference monitor 460 may provide the token to each security policy module of a security policy framework to thereby obtain labels from each security policy module for the particular token, or optionally a default label if no specific labels for this token are found.

Once the token is used to generate the labelset, the labelset is associated with a security association in the reference monitor 460. The security association is a unique identifier of the communication connection between a particular protected environment or partition and the reference monitor 460. The particular values used for generating the security association are dependent upon the particular implementation of the present invention. For example, in one illustrative embodiment, a combination of a communication identifier, e.g., TCP/IP address, secure socket identifier, and session identifier may be used to generate a unique security association (SA). Alternatively, only the secure socket identifier and session identifier may be used to generate a SA for a particular protected environment or partition. Other types of information and other combinations of information may be used so long as a unique identifier may be generated for each protected environment or partition being managed by the reference monitor 460.

This unique security association is generated within the reference monitor 460 and is not accessible outside the reference monitor 460. The SA is stored in association with the labelset generated for the protected environment/partition in a data structure associated with the reference monitor 460. Using this security association, the reference monitor 460 may quickly determine a labelset associated with a source of a request. That is, by looking at the information regarding the communication connection with the source protected environment, which is present, for example, in the header information of the request, the reference monitor may generate a SA for the request and perform a lookup of the SA in the data structure to obtain the associated labelset. In this way, the reference monitor 460 for use in handling information flow requests from the protected environments 410-430.

A token may be used to identify security attributes that are recognizable by the reference monitor 460. For example, a user may authenticate with an authenticator 450 using a user ID and password. The authenticator may provide the protected environment, from which the user's request for authentication was received, with a token with the following attribute: "userc". The reference monitor 460 may receive the token and build a labelset for the protected environment. For example, a reference monitor 460 running with the Group-DAC and BLP policies may already have userc associated with "IBM-GROUP" and "NEWHIRE-GROUP" as Group-DAC assignments and "CONFIDENTIAL" as a BLP assignment, for example. These labels may be added to a labelset for the protected environment.

A SA for the protected environment may then be generated by the reference monitor 460 based on the connection information for the protected environment. The SA is then stored in association with the generated labelset in the reference monitor 460. Thereafter, when a request is received from the protected environment, a SA is generated by the connection information for the request and is used to retrieve the labelset.

The SA essentially serves as an internal identifier of the protected environment 410-430 and is generated from the connection to the reference monitor 460. This security association may be used in information flow requests to thereby identify the protected environment from which an information flow request was received. For example, when a protected environment 410-430 connects to the reference monitor 460, it provides a protected environment name. This name may be stored in the reference monitor 460 in association with the protected environment's associated unique security association (unknown to the outside world) and related labelset. The protected environment names may be used by a source protected environment to identify a target protected environment in an information flow request.

For example, protected environment A may connect to the reference monitor 460 and identify its name as "PARTITIONA" (protected environments may also be referred to as "partitions" in the context of the present invention). Protected environment B may connect to the reference monitor 460 and identify its name as "PARTITIONB". If protected environment A wants to send information to protected environment B, protected environment A sends an information flow request to the reference monitor 460 indicating the target of the information flow to be "PARTITIONB." The reference monitor 460 will then do the appropriate labelset lookup, as described hereafter, and execute an authorization decision for the information flow request.

The labelsets permit the reference monitor 460 to perform set theory on the labelsets of the source and target protected environments 410-430 to determine which information flows are permitted and which are denied, as will be described in greater detail hereafter. Based on the decision made by the reference monitor 460 as to whether an information flow is permitted, the communication may be allowed to flow through to the target protected environment or it may be blocked by the reference monitor 460.

Reference Monitor Architecture

Figure 5:
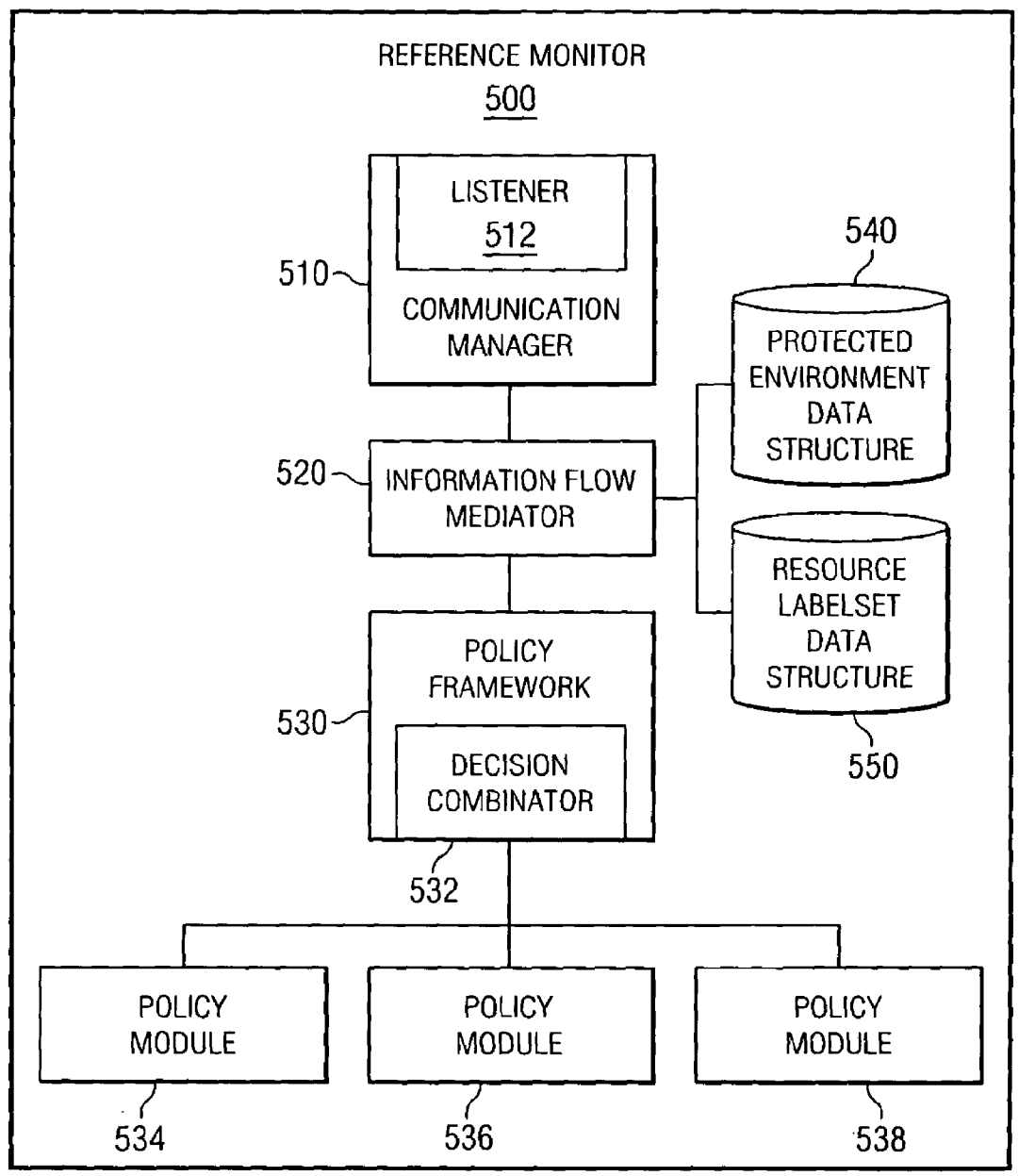
FIG. 5 is an exemplary diagram of a reference monitor in accordance with an illustrative embodiment.

FIG. 5 is an exemplary block diagram of a reference monitor 500 in accordance with one illustrative embodiment. As shown in FIG. 5, the reference monitor 500 includes a communication manager (CM) 510 with a listener sub-component 512, an information flow mediator (IFM) 520, a policy framework 530 having a decision combinator 532 and a plurality of policy modules 534-538. In addition, a protected environment labelset data structure 540 and resource labelset data structure 550 are maintained during runtime.

The listener 512 listens for information flow requests from protected environments 410-430 in FIG. 4. For example, the listener 512 may listen to particular ports for information flow requests directed to that port by applications, devices, and/or systems in protected environments 410-430. The information flow requests may be, for example, a communication message identifying the resource that is the subject of the information flow, the source protected environment of the information flow from which the resource is obtained, and the target protected environment of the information flow to which the resource is provided.

In one illustrative embodiment, the information flow requests designate the protected environment name of the target protected environment. From this protected environment name, the labelset associated with the target protected environment may be retrieved. From connection information provided in the information flow request or obtained inherently from the ports, sockets, etc. via which the information flow request is received, the reference monitor may generate a SA for the request and use this SA to retrieve the labelset associated with the source protected environment.

For example, the information flow request may have a format consisting of a message type and a message body as follows:

TABLE 1

Information Flow Request Message Format

| Message Type | Message Body |
| --- | --- |

The message type is the type of message that is being sent to or from the reference monitor 500 and the message body contains the related information that corresponds to the message type. The reference monitor 500, in response to receiving an information flow request message, may respond with a response message, if configured in a verbose mode of operation, or a reply message, if the reference monitor 500 is configured to not be in a verbose mode of operation. These different message types are formatted as follows:

TABLE 2

Reference Monitor Response Message Format

| Message Type | | Message Body | |
| --- | --- | --- | --- |
| Response | <Result> | <Major Description Response> | <Minor Description Response> |

TABLE 3

Reference Monitor Reply Message Format

| Message Type | Message Body |
| --- | --- |
| Reply | <Reply Message> |

In one illustrative embodiment, the message type for messages sent to the reference monitor 500 may be infoFlowRequestStreamOpen, infoFlowRequestStreamSend, infoFlowRequestStreamClose, or infoFlowRequestResource. Each of these information flow request messages and the reference monitor 500 response or reply messages will be described hereafter.

The infoFlowRequestStreamOpen message type is used to cause the reference monitor to make a call to the IFM 520 requesting an information flow request decision to grant or deny an information stream from the source protected environment to the target protected environment. If the information stream is granted, the source and target security association pair is added to an entry in an open information flow streams table that is used to determine if an information flow can be forwarded to the target protected environment by the reference monitor. If the infoFlowRequestStreamOpen message results in the target protected environment's labelset being updated, the reference monitor 500 will close any existing streams of the target protected environment and will notify all source protected environments of the stream closures within a reply message type.

The infoFlowRequestStreamOpen message type has an associated message body that identifies the target protected environment with which the information stream is to be established. In an illustrative embodiment, the message body is comprised of the target protected environment token.

In response to the infoFlowRequestStreamOpen message, the reference monitor 500 may return one of the following response messages:

TABLE 4

Response Messages to infoFlowRequestStreamOpen Message

| Message Type | Message Body | | |
|---|---|---|---|
| response | <Result> | <Major Description Response> | <Minor Description Response> |
| response | SUCCESS | FLOW_GRANTED | |
| response | SUCCESS | FLOW_GRANTED | TARGET_LS_UPDATED |
| response | SUCCESS | FLOW_DENIED | |
| response | FAILURE | INVALID_PARM | |
| response | FAILURE | MSG_OUT_OF_SEQ | |
| response | FAILURE | INTERNAL_ERROR | |
| response | FAILURE | COMPONENT_BUSY | |

Messages having a major description response consisting of the "FLOW_GRANTED" result from the IFM 520, result in a new entry of the source and target protected environments' security association pair being added to the open information flow streams table maintained by the reference monitor 500. The message having the major description response consisting of the "FLOW_DENIED" result from the IFM 520, results in a source and target protected environment security association pair not being added to the open information flow streams table. Similarly, the messages having major description responses of "INVALID_PARM," "MSG_OUT_OF_SEQ," "INTERNAL_ERROR," and "COMPONENT_BUSY" also result in the security association pair not being added to the open information flow streams table. The message having the minor description response "TARGET_LS_UPDATED" is the message returned by the reference monitor 500 when the IFM 520 determines that the target labelset has to be updated and the streams associated with the target labelset are closed down.

The following replay message is sent to protected environments when the reference monitor 500 is in verbose mode and when a stream is forced closed by the reference monitor 500 (e.g., when an infoFlowRequestStreamOpen results in the target labelset being updated):

TABLE 5

Stream Closed Reply Message

| Message Type | Message Body | | |
|---|---|---|---|
| reply | <Reply Message> | | |
| reply | referenceMonitor | streamClosed | <Target Name> |

The infoFlowRequestStreamSend message type is used by a source protected environment to send information to a target protected environment once the information stream has been granted by the reference monitor 500. When the reference monitor 500 receives this request, the reference monitor 500 validates that an entry in the open information flow streams table exists for the source and target protected environments' security association pair thereby indicating that the stream information flow has been previously granted. The reference monitor 500 then forwards the information to the target protected environment within a reply message. The following is the format of the infoFlowRequestStreamSend message:

TABLE 6 infoFlowRequestStreamSend Message Format

| Message Type | Message Body | |
|---|---|---|
| infoFlowRequestStreamSend | <Target Name> | <Information> |

The following are the various types of response messages that the reference monitor may generate in response to the infoFlowRequestStreamSend message:

TABLE 7

Response Messages to infoFlowRequestStreamSend Message

| Message Type | Message Body | | |
|---|---|---|---|
| response | <Result> | <Major Description Response> | <Minor Description Response> |
| response | SUCCESS | SUCCESS | |
| response | FAILURE | INVALID_PARM | |
| response | FAILURE | MSG_OUT_OF_SEQ | |
| response | FAILURE | REQ_DENIED | |
| response | FAILURE | INTERNAL_ERROR | |
| response | FAILURE | COMPONENT_BUSY | |

If the response message has a major description response of a "SUCCESS" result from the IFM 520, then the target protected environment receives the information from the source protected environment. The other major description responses will result in the target protected environment not receiving the information from the source protected environment.

The following is a reply message format that may be generated in response to the infoFlowRequestStreamSend message:

TABLE 8

Reply Message to infoFlowRequestStreamSend Message

| Message Type | Message Body | |
|---|---|---|
| reply | <Reply Message> | |
| reply | <Source Name> | <Information> |

This reply message may be used by the reference monitor 500 to send the information from the source protected environment to the target protected environment, for example.

The infoFlowRequestStreamClose message type is used by a source protected environment to close an open stream to a target protected environment. When the reference monitor 500 receives this request, the reference monitor 500 halts all stream information flow from the source protected environment to the target protected environment. The reference monitor 500 then removes the source and target protected environments' security association pair entry from the open information flow streams table. The infoFlowRequestStreamClose message has the following format:

TABLE 9

| infoFlowRequestStreamClose Message Format | |
| --- | --- |
| Message Type | Message Body |
| infoFlowRequestStreamClose | <Target Name> |

The possible responses that the reference monitor 500 may make to an infoFlowRequestStreamClose message are essentially the same as shown in Table 7 above with the exception that the "REQ_DENIED" response message would not be returned by the reference monitor 500.

The infoFlowRequestResource message type is used by a source protected environment to request authorization and delivery of a resource, e.g., a file, chat text, or other type of bundled portion of data that is not part of a continuous data stream, to a target protected environment. When the reference monitor 500 receives this message type, the reference monitor 500 makes a call to the IFM 520 requesting an information flow request decision to grant or deny the resource to flow from the source protected environment to the target protected environment. If the information flow is granted, then the resource is transferred to the target protected environment within a reply message type. If the request results in the target protected environments' labelset having to be updated, the reference monitor 500 will close existing streams of the target protected environment and notify the source protected environments of the stream closures within a reply message type if the reference monitor 500 is configured in verbose mode. If the information flow is denied, the resource is not transferred to the target protected environment. The infoFlowRequestResource message has the following format:

TABLE 10

| infoFlowRequestResource Message Format | | |
| --- | --- | --- |
| Message Type | Message Body | |
| infoFlowRequestResource | <Target Name> | <Resource> |

The possible responses from the reference monitor 500 to the infoFlowRequestResource message are essentially the same as shown in Table 4 above. The following reply message is sent to protected environments when the reference monitor 500 grants the resource information flow:

TABLE 11

| Reply Message for infoFlowRequestResource Message | | |
| --- | --- | --- |
| Message Type | Message Body | |
| reply | <Reply Message> | |
| reply | <Source Name> | <Resource> |

Returning to FIG. 5, when the reference monitor 500 receives an information flow request from a protected environment, such as the protected environment 410, through the listener 512 of the CM 510, the CM 510 sends a request to the IFM 520 for an authorization decision. The authorization decision is one that determines whether the information flow is to be permitted from the source protected environment, e.g., protected environment 410, to the target protected environment, e.g., protected environment 430. The authorization decision may be made based on a comparison of the target protected environment labelset to one or both of the source protected environment's labelset and the resource's labelset.

In illustrative embodiments, the IFM 520, in response to receiving the request for authorization of the information flow, may perform a lookup of the identifiers, e.g., the SA of the source protected environment and the protected environment name of the target protected environment, in the protected environment data structure 540. As a result of this lookup operation, the IFM 520 retrieves the source and target protected environments' associated labelsets from the protected environment data structure 540 and provides these labelsets to the policy framework 530. If the lookup operation results in one or more of the source and target protected environments not having an associated labelset, the request may be denied. Alternatively, a default labelset may be utilized for the protected environment that does not have an associated labelset.

In addition to associating labelsets with the source and target protected environments, the reference monitor 500 may also associate labelsets with individual items of information, i.e. information objects, using the resource labelset data structure 550. As will be discussed in greater detail hereafter, in one illustrative embodiment, the labelset of the individual item of information, or an effective labelset generated from the labelset of the individual item of information and a labelset of the source protected environment, may be compared to the labelset of the target protected environment if a labelset for the individual item of information exists in the reference monitor 500. If a labelset for the item of information does not exist in the reference monitor 500, a labelset for the source protected environment may be used and associated with the item of information.

The labelsets essentially define a list of security policies which the policy framework 530 interprets and dispatches to the appropriate policy modules 534-538 for processing. The policy modules 534-538 may use any of a number of different types of algorithms for performing evaluations of the labelsets to generate a decision. For example, the policy modules 534-538 may make use of a Chinese Wall algorithm, a Bell LaPadula mandatory access control (MAC) algorithm, a group discretionary access control (DAC) algorithm, or the like.

Once all of the individual evaluations are processed by the policy modules 534-538, the policy framework 530 combines the individual decisions to generate a final decision. The decision combinator 532 of the policy framework 530 serves to aggregate the decisions of the individual policy modules 534-538 and uses a combinator policy, i.e. a set of combinator rules, provided in the decision combinator 532 to produce one decision, i.e. grant or deny the information flow.

For example, the decision combinator 532 may aggregate the decisions of each individual policy module 534-538 by using ternary logic to evaluate the results from each policy module 534-538 which can produce the results: GRANTED, DENIED, or NO_DECISION. The decision combinator 532 may operate based on a combinator policy file that contains one or more combinator policies. By default, the combinator policy file may contain a default combinator policy as described below:

```
((admin RESULT = GRANTED)
 OR (blp RESULT = GRANTED)
)
``` where admin and blp are two policy modules and the combinator policy indicates that if either of these policy modules returns a "GRANTED" result, then the information flow is granted.

The combinator policy file may be customized by an administrator using the following syntax, which will be interpreted by a combinator policy parser:

```
<combinator rule> ::= <expression>
<expression>     ::= (NOT <expression>) /
                     (<expression>) /
                     (<expression> AND <expression>) /
                     (<expression> OR <expression>) /
                     (<policy module name> RESULT =
                     <result>)
<result>         ::= GRANTED /
                     DENIED /
                     NO_DECISION
```

In making decisions as to whether a particular information flow will be permitted or denied, the mechanisms of the illustrative embodiments make such decisions only upon the labelsets of the source protected environment, the target protected environment, and the individual items of information, i.e. the resource labelsets, if any. In this manner, the "actions" that are being performed in a transaction, which in known systems must be considered in determining whether two entities must communicate, are eliminated from the evaluation in the illustrative embodiments.

In effect, the minimalist reference monitor 500 of the illustrative embodiments bases decisions only upon the sensitivity of the objects, i.e. the items of information involved in the information flow, and the authorization level of the subjects, i.e. the source and target protected environments. This allows the reference monitor 500 to be treated as a "black box" thereby simplifying the implementation and significantly reducing the size of the reference monitor 500 since not every possible action between every pair of source and target entities must be modeled in the reference monitor 500.

In addition, the level of security provided by the operation of the reference monitor 500 is not dependent upon the level of the security of the protected entity. This is especially important when the mechanisms of the illustrative embodiments are used to protect existing entities whose level of security is poor or unknown and which may not be able to be modified to provide better security. In other words, because the labelsets and their associations are maintained completely within the reference monitor 500, the security, or lack thereof, of the protected entities does not negatively affect the security offered by the reference monitor 500. The security of the reference monitor 500 is dependent only upon the level of security defined in the labelsets.

Labelsets

As mentioned above, the mechanisms of the illustrative embodiments make use of labelsets, which may be stored in association with partition names and security associations in the protected environment data structure 540, to govern the security evaluations performed by the policy framework 530. These labelsets may be created and managed by reference monitor 500 and are used to identify the source and target security characteristics which need to be known in order to make an authorization decision for an information flow. Similarly, as mentioned above and discussed hereafter, labelsets may be provided and stored in the resource labelset data structure 550 for individual items of information.

FIG. 6 is an exemplary diagram illustrating an exemplary definition of a labelset in accordance with one illustrative embodiment. As shown in FIG. 6, the labelset includes a labelset name element <labelset> associated with a version element <version> indicating the version of the <labelset>. The version element is the assigned version number of the data structure. The version element is composed of a major element <major> and a minor element <minor>. The major element is the assigned major version number of the data structure or sub-structure. The major element's range is 1 to $(2^{64}-1)$. The minor element is the assigned minor version number of the data structure or sub-structure. The minor element's range is 0 to $(2^{64}-1)$.

The major and minor elements of the version element may be thought of as being similar to a software version number, e.g., Microsoft Word™ 10.6764 where 10 is the "major" version and 6764 is the "minor" version. The major and minor elements are used to determine if different versions of labelsets are being compared.

For example, the first time the reference monitor 500 is started, labelsets may get created with major version 1 and minor version 0 (1.0). The admin policy module may be the only policy module available during the first startup. While the initial start up of the reference monitor 500 is up and running, the reference monitor 500 administrator may set up the reference monitor 500 to add a BLP policy module the next time the reference monitor 500 is started. Before the system is restarted the administrator may also add a resource which will assign a labelset with just the admin policy values since it is the only policy module running at the current time and gets assigned a major and minor version of 1.0.

After the system restarts the BLP policy module is added. A first protected environment (partitionA) may then attempt to send a resource to a second protected environment (partitionB). Since the policy modules have been updated, the new major and minor elements are "1" and "1" or 1.1. Thus, any newly generated labelsets will have a version element of "1.1." Since the resource labelset that is trying to be sent is 1.0, the reference monitor 500 knows it need to update the labelset before evaluating an authorization request.

A count element <count> is also provided that indicates the number of labels included in the label list element <labellist>. The count element's range is from 1 to 65535.

The label list element <labellist> is composed of label elements <label> which are in turn composed of one policy type element <policy_type> and one value element <value>. The policy type element <policy_type> is an enumerated value identifying the security policy associated with the label element. Table 1 below shows an example list of the policy types that may be used with the mechanisms of an illustrative embodiment.

TABLE 1

Example Policy Types

| Name | Value | Description |
| --- | --- | --- |
| Blp | 1 | Bell La-Padula Security Model Based on Information Sensitivity |
| Groupdac | 2 | Discretionary Access Control Based on Group Membership |
| Cw | 3 | Chinese Wall Security Model |

The value element is an enumerated value identifying the policy value and is implementation specific. A simple example is that for BLP, the policy values may be 1, 2, 3, and 4 to represent UNCLASSIFIED, CONFIDENTIAL, SECRET and TOPSECRET respectively. For Groupdac, for example, an organization, such as IBM, may have values of 1, 2, 3, 4, and 5 to represent IBMER, CONTRACTOR, NEWHIRE, MGR, EXECUTIVE respectively. A person that is a regular employee at IBM and a recent new hire would thus, have a labelset including values 1 and 3.

Thus, the policy_type identifies which policy is to be applied and the policy value identifies which specific policy values are evaluated by the policy. A combination of the policy type and the policy values makes a complete representation of the security attributes of a protected environment or resource. For example, if a protected environment is used to represent a user, the labelset for the user may have the following values for a reference monitor 500 running the BLP and GROUPDAC policy modules:

```
Policy_Type: 1 ( BLP )
    Policy_Value: 3 ( SECRET )
Policy_Type: 1 ( BLP )
    Policy_Value: 2 ( CONF. )
Policy_Type: 1 ( BLP )
    Policy_Value: 1 ( UNCL. )
Policy_Type: 2 ( GROUPDAC )
    Policy_Value: 1 ( IBMER )
Policy_Type: 2 ( GROUPDAC )
    Policy_Value: 3 ( NEWHIRE )
```

From this labelset it can be determined that the user is a regular employee of IBM, is a newhire, and has access to unclassified, confidential and secret information.

The labelsets generated by the illustrative embodiments describe information only in terms of sensitivity and not in terms of the operations which are used to transform or transmit the information. This separation of concerns enables the implementation of a very simple policy decision mechanism by decoupling the semantics of security policy evaluation from the semantics of data manipulation by applications.

In addition, the labelsets provide a mechanism for defining a single security attribute type to sources and targets, i.e. a labelset consisting of a set of security attribute labels. In this way, the labelsets of the illustrative embodiments eliminate the distinction between active subjects and passive resources. The labelsets of the illustrative embodiments restrict their attention to the flow of information between a source and a target, each of which has the same abstract security attribute type.

In using these labelsets to perform decisions on whether to authorize or deny a flow of information, the policy framework may make use of a relatively simple group of set-theoretic rules built from the source and target labelsets using the set union, intersection, and complement operations. Thus, the policy framework permits a flow of information if the policy framework decides that the source and target labelsets are "compatible." In this way, a single simple rule may be used to control all flows of information between any source and any target, from the source to the target. This same rule may also be applied for a reverse direction of flow from any target (which now operates as a source) to any source (which now operates as a target). Simple set theory is applied by the rule to determine if the flow of information is to be permitted or not.

As an example to illustrate this functionality in the policy framework made possible by the use of labelsets, consider the two example labelsets provided in FIGS. 7A and 7B. FIG. 7A is an exemplary diagram of a first labelset in accordance with one illustrative embodiment that may be associated with a first protected environment. FIG. 7B is an exemplary diagram of a second labelset in accordance with one illustrative embodiment that may be associated with a second protected environment.

In the labelset 700 of FIG. 7A, a labellist 710 is provided having three labels 720, 730, and 740, hence the count element 702 is set to a value of "3." The three labels 720, 730 and 740 have enumerated values 722, 732 and 742 of "3," "2," and "1." The label 722 corresponds to a sensitivity level of "secret," the label 732 corresponds to a sensitivity level of "confidential," and the label 742 corresponds to a sensitivity level of "unclassified." In addition, each label has an associated security policy type 724, 734, and 744 having a value of "1," which corresponds, for example, to a "Multilevel" or "MLS" security policy in this particular example.

In the labelset 750 of FIG. 7B, a labellist 760 is provided having a single label 770, hence the count element 752 is set to a value of "1." The label 770 has an enumerated value 772 of "1." Thus, the label 770 corresponds to a sensitivity level of "unclassified." Similar to the security policy types in the labelset 700, the label 770 has a security policy type of "1."

As discussed previously above with regard to FIG. 5, in response to an information flow request from a source protected environment, the information flow mediator 520 of the reference monitor 500 retrieves the labelsets for the source protected environment, target protected environment, and possibly the item of information that is the subject of the information flow, from protected environment data structure 540 and resource labelset data structure 550. In this particular example, it will be assumed that the labelset 700 corresponds to a source protected environment and the labelset 750 corresponds to a target protected environment, and that a labelset for the item of information is not used.

The retrieved labelsets 700 and 750 are provided to the policy framework 530 which parses the labelsets 700 and 750 and determines which policy types are identified in the various labels of the labelsets. The labelsets 700 and 750 are then provided to the policy modules 534-538 corresponding to the policy types identified in the labelsets 700 and 750. The policy modules 534-538 then generate decisions as to whether the information flow is to be granted or denied. These decisions are returned to the policy framework 530 which combines these decisions using the decision combinator 532. The decision combinator 532 combines the various decisions to thereby generate a single decision as to whether the information flow is to be granted or denied. The final decision is provided to the communication manager 510 which then operates to either permit the information flow to continue to the target protected environment or to block the information flow.

In the present example, the policy framework 530 parses the labelsets 700 and 750 and determines that the security policy type "1" is used by the labels in the labelsets 700 and 750 which corresponds to the "MLS" security policy. As a result, the policy framework 530 may send the labelsets 700 and 750 to the policy module 534 which corresponds to the "MLS" security policy.

The MLS security policy, in the present example, contains a rule that states that information may flow from a source protected environment to a target protected environment if the following condition is met:

$$\text{if \{mlsvalues of source\} is\_subset\_of \{mlsvalues of target\}}$$

Applying this rule to the labelsets 700 and 750 results in the information flow from the source protected environment to the target protected environment being denied. This is because the values in labelset 700 are not a subset of the values in labelset 750, i.e. the set $\{3, 2, 1\}$ is not a subset of the set $\{1\}$. In other words, the information flow is blocked because information may not flow from a potentially secret source protected environment to an unclassified protected environment.

On the other hand, information flow may be authorized under the same MLS policy and rule in the opposite direction, i.e. from the target protected environment (which would now act as a source) to the source protected environment (which would now act as a target). This is because the set $\{1\}$ is a subset of the set $\{3, 2, 1\}$. In other words, information may flow from an unclassified source protected environment to a potentially secret target protected environment.

Once an information flow has been authorized using the reference monitor 500 of the illustrative embodiments, the flow of information from the source protected environment to the target protected environment may continue without having to perform the authorization again until the stream of information flow is discontinued. That is, the mechanisms of the illustrative embodiments may be used to authorize a stream of information flow from a source protected environment to a target protected environment.

Alternatively, the mechanisms of the illustrative embodiments may also be used to authorize a single transfer of information from a source protected environment to a target protected environment, such as in the case of a file transfer, for example. The mechanisms of the illustrative embodiments operate substantially the same whether the mechanisms are used to authorize streams of information flow or a single transfer of information.

As mentioned above, policy rules may be established for performing authorization not only based upon the labelsets of the source and target protected environments, but also upon the labelsets of the particular items of information that are being transferred. However, it should be noted that even when the labelsets of the items of information are considered in the authorization operation, the decisions are based solely on the sensitivities of the item of information and the source and target protected environments. That is the labelsets of the source and target protected environments are a measure of the sensitivity of the information that the source and target protected environments may maintain. The labelset of the item of information is a measure of the sensitivity of the item of information. Thus, decisions as to whether an information flow is to be granted or denied are based on the sensitivities of the entities involved in the information flow, not upon the particular actions that are being performed as part of the information flow, e.g., reading, writing, etc.

In one illustrative embodiment, when using the labelsets associated with a source and target protected environment and the item of information, the information flow mediator 520 first tries to retrieve a labelset associated with the item of information from the resource labelset data structure 550. If a labelset is not established for the item of information, then a labelset for the source protected environment is used in the evaluation made by the policy framework 530, i.e. the labelset of the source protected environment is compared to the labelset of the target protected environment in accordance with the applicable policy rules to determine if the information flow is to be granted or denied. If a labelset is present in the resource labelset data structure 550 for the item of information, then that labelset is used along with the source protected environment labelset and thus, is compared, by the policy framework 530, to the target protected environment labelset to determine if the information flow is to be granted or denied.

In an alternative illustrative embodiment, all of the labelsets for the source protected environment, target protected environment, and the item of information may be evaluated by the policy framework 530 when determining whether to grant or deny the information flow. For example, security policy rules may be established that perform set theory operations on all three sets. Of course, such an embodiment is more complex and will require additional processing cycles to perform the policy evaluation. However, a more complex control of information flows may be made possible by including all three labelsets in the policy evaluation.

Moreover, in one illustrative embodiment, if a labelset is provided for an item of information that is the subject of the information flow, this labelset may be combined, in accordance with combinatory rules associated with a security policy module, with the labelset for the source protected environment to generate an effective labelset. This effective labelset may then be compared with the target labelset in policy modules of the policy framework to thereby generate authorization decisions.

Thus, as shown above, the labelsets of the illustrative embodiments provide a simple mechanism for defining the sensitivity of a protected environment with which they are associated. The use of these labelsets permits the simplification of the security policies that are applied to these labelsets since such security policies need only be concerned with the sensitivities of the source, target, and possibly the item of information, as defined by the labelsets. Because the particular actions being performed are removed from consideration during the authorization process, the security policies need not have rules to govern each possible action that may be performed by each combination of a source and target. This decoupling of the semantics of security policy evaluation from the semantics of data manipulation greatly reduces the complexity of the security policies and rules that make up the security policies.

Furthermore, in order to make decisions based on these sensitivities, simple set theory operations may be used to define the rules of the security policies that operate on the labelsets. Because the security policies use set theory to implement their associated algorithm, the same small set of rules may be applied to any information flow request, regardless of the particular source protected environment and target protected environment.

Moreover, since all of the entities involved in an information flow, i.e. the source and target protected environments and the item of information, make use of the same security attribute type, i.e. the labelset, the issues associated with differing attribute types having to be accommodated in the security policies are avoided. Thus, the mechanisms of the illustrative embodiments greatly simplify the implementation of a security framework for governing information flows. Because of this simplification, the rate at which information flows may be processed by the reference monitor is increased. In addition, because the labelsets and security policies are maintained completely within the reference monitor, tampering with the labelsets or security policies is made more difficult and the security of the system as a whole is improved over systems in which elements of the security mechanisms are distributed to non-secure computing devices.

Associating Labelsets with Resources

With reference again to FIG. 5, associating security labels with resources, such as in the resource labelset data structure 550, may be performed in many different ways. In order to build a highly assurable system, the mechanism that manages these labelsets, e.g., the reference monitor 500, should avoid accidentally corrupting the labelsets while processing information flow requests. In addition, the system should eliminate the possibility of malicious alteration of labelsets, even by privileged system administration personnel.

One possibility is to store the labelset information with the resource to which it applies, e.g., the item of information, such as a file, portion of chat text, or other packaged portion of data that is not part of a continuous data stream, and implementing a special privilege and authorization mechanism to restrict access to the labelset information. There are two problems with this approach. First, an integrity failure in the system which manages the items of information and associated labelset information can result in unauthorized changes to labelsets. That is, if a user can alter a file on the file system, they can also alter the labelset that is also stored with the file on the file system. With the illustrative embodiments herein, although a user may be able to alter a file on a file system, the user cannot alter the labelset within the reference monitor 500 because the labelsets are not accessible outside of the reference monitor 500.

Second, applications which are not designed to accommodate labelsets cannot be protected. That is, since, in such an embodiment, the security mechanism, i.e. the reference monitor 500, expects the application or protected environments to pass the labelset information to the security mechanism, if an application or protected environment does not support the use of labelset information, it cannot provide the necessary labelset information to the security mechanism. As a result, the security mechanism has no access to labelset information for the application or protected environment and thus, cannot ensure the security of information flows from the application or protected environment.

The mechanisms of the illustrative embodiments address these problems by enabling the storage of information labelsets inside a trusted computing base, i.e. the reference monitor 500, which is separate from the repositories in which the information itself is stored, i.e. the repositories in the protected environments. The mechanisms of the illustrative embodiments associate labelsets with the information to which they refer through the use of a hash table which may be provided in the resource labelset data structure 550, for example. A hash key is generated, by the information flow mediator 520 of the reference monitor 500, for example, based on the content of the resource, e.g., the item of information. The hash key is used as an index into a table of labelsets, e.g., resource labelset data structure 550 and may be used to a retrieve labelset associated with a particular item of information that is the basis for the hash key.

The first time a resource is encountered by the reference monitor 500, the information flow mediator 520 of the reference monitor 500 computes a hash key of the resource and stores an appropriate labelset in the resource labelset data structure 550 at the index corresponding to the computed hash key. If the resource has been registered in the reference monitor 500 by an administrator, then computing the hash key of the resource will result in a matching entry of the labelset data structure 550 being identified. If the resource has not been registered by the administrator, then the resource will take the same labelset as the source protected environment. The generation of hash keys as indices into a hash table is generally known in the art and thus, the details of hashing are not provided herein.

Once the resource has been assigned a labelset, any renaming of the resource, e.g., renaming a file, does not affect the association of the hash key with the labelset because the hash key is generated based on the content of the resource, which in this case has not changed. Thus, merely changing the name associated with a resource does not change the resource's hash key and thus, does not change the labelset associated with the resource.

However, any change in the content of the resource creates, from the viewpoint of the reference monitor 500, a new resource, a new hash key, and a new labelset association. Thus, so much as a single bit change in the content of the resource causes a new hash table entry to be created for the resource. The hash table permits the trusted computing base, e.g., reference monitor 500, to efficiently recognize resources and store their labelsets while permitting the resources themselves to be stored outside the trusted computing base in unmodified, and possibly untrusted, applications.

In order to avoid problems associated with accidental or maliciously induced hash collisions, a multi-dimensional hash table may be used in the resource labelset data structure 550. A different hash function may be employed in each dimension of the multi-dimensional hash table. Thus, generating a table index collision, which would be required to "forge" a labelset, requires an adversary to find a string whose hash image collides with that of a chosen resource simultaneously in all the hash functions used to implement the multidimensional table. This is very improbable and provides a great deal of security with regard to the association of hash keys with labelsets for resources.

The use of the hash table to make the association of resources with labelsets ensures that the labelset associated with a specific datum can always be recovered by the trusted computing based, e.g., reference monitor 500, and the information storage format of an application does not have to be changed to accommodate labelsets because the labelsets are not stored with the information to which they apply. Moreover, whenever a datum is changed in any way, the trusted computing base (e.g., reference monitor 500) may recognize the change, because the modified datum will have a different hash, and may determine that a new labelset needs to be applied to the modified datum. Furthermore, no integrity failure, or malicious action, originating in an application or anywhere else outside the trusted computing base can modify either the association between a datum and its labelset or the labelset itself since both the association and the labelset are stored inside the trusted computing base and are never passed out of the trusted computing base.

FIGS. 8 and 9 provide examples illustrating the use of a hash table to associate labelsets with resources when handling information flow requests. FIG. 8 illustrates such an example when an entry corresponding to a resource is present in the hash table. FIG. 9 illustrates such an example when an entry corresponding to a resource is not present in the hash table.

As shown in FIG. 8, application_2 requests resource_2 from the resource_system. Thus, the resource_system would be in the source protected environment 810, application_2 would be in a target protected environment 820, and resource_2 is an item of information for the information flow. The request is provided to the trusted computing base 830, which in the illustrative embodiments is the reference monitor 500, for example. While the illustrative embodiments will consider the trusted computing base 830 to be the reference monitor 500, the present invention is not limited to such, and any trusted computing base may be used without departing from the spirit and scope of the present invention.

The trusted computing base intercepts the request, such as via the communication medium 440 in FIG. 4. The request may be an information flow request, such as described previously above, that identifies the name of the target protected environment 820. The security association of the source protected environment and the name of the target protected environment may be used with protected environment data structure 840 to retrieve labelsets associated with the protected environments 810 and 820.

In response to the information flow request, the trusted computing base 830 retrieves the contents of the item of information, i.e. resource_2, from the source protected environment 810 and performs the appropriate hash function(s) on the complete contents of the item of information. The hash function(s) may be a single hash function or, in the case of a multidimensional hash table embodiment, multiple hash functions of differing types. The resulting hash key is used to index into the resource labelset data structure 850.

In the depicted example, an entry is present in the resource labelset data structure 850 for the generated hash key. As a result, the trusted computing base 830 retrieves labelset_2 from the resource labelset data structure 850 and uses this labelset_2 along with the labelset for the source protected environment (labelset_1) to create an effective labelset. This effective labelset is compared against the labelset for the target protected environment 820, i.e. labelset_4 obtained from the protected environment data structure 840 based on the name of the target protected environment 820 provided in the information flow request. The comparison is performed in accordance with the policies identified in the retrieved labelsets using the policy framework 530 in FIG. 5 and its associated policy modules 534-538 and decision combinator 532, as discussed previously. Based on the results of the comparison, the information flow is either granted or denied. If granted, the requested resource, i.e. resource_2, is allowed to flow to the target protected environment 820. If denied, the trusted computing base 830 blocks the flow of the requested resource, i.e. resource_2, to the target protected environment 820 and may return an error message to the requester, e.g., application_2 in target protected environment 820.

In another example, shown in FIG. 9, a similar operation is performed, in which application_1 requests resource_1 from the resource_system. In this example, application_1 is the target protected environment 860 and the resource_system is the source protected environment. The resource_system sends an information flow request to the trusted computing base 830 requesting resource_1 to be sent to application_1. In this case, when resource_1 is retrieved from the source protected environment 810, the hash of the complete contents of resource_1 does not have an associated entry in the resource labelset data structure 850. In this case, the trusted computing base 830 stores the labelset associated with the source protected environment, e.g., labelset_1, in an entry in the hash table of the resource labelset data structure 850 at an index corresponding to the computed hash key for the contents of resource_1. The trusted computing base 830 then compares this labelset for the source protected environment 810, i.e. labelset_1, to the labelset for the target protected environment 860 to determine whether the information flow request will be granted or denied.

It should be noted that at no time in the above operations is any information about the labelsets or any information about the hash values which associate labelsets with resources, passed from the trusted computing base 830 to any application, system, or protected environment outside the trusted computing base 830. Thus, the security of the labelsets and the association of labelsets with resources is ensured against unintentional or malicious modification.

It should also be noted that while the above examples illustrate a comparison of a labelset associated with a resource, e.g., an item of information, or a source protected environment with the target protected environment labelset, the present invention is not limited to such. Rather, as mentioned previously, in more complex embodiments, policies and rules may be established for comparing all three labelsets to determine whether to grant or deny an information flow request.

Thus, the illustrative embodiments provide mechanisms for associating labelsets with resources and protected environments in a secure manner and using these labelsets with policies to authorize or deny information flows. A secure indexing mechanism and token association mechanism are provided for associating labelsets with resources and protected environments. The labelsets themselves provide a mechanism for simplifying policy decisions by allowing policies and rules to be defined in terms of set theory operations to be applied to the labelsets to determine if an information flow is to be granted or denied.

Figure 10:
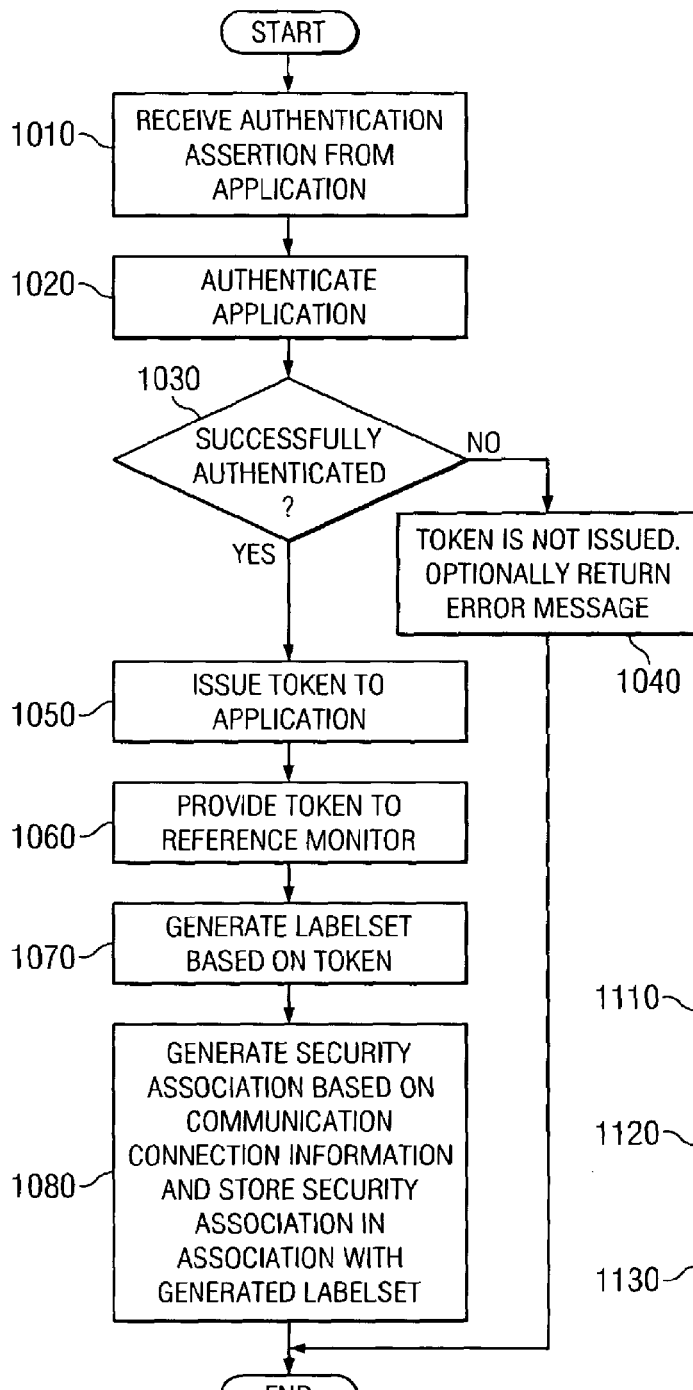
FIG. 10 is a flowchart outlining an exemplary operation for granting tokens to applications, devices, systems, etc. so as to establish a protected environment.
Figure 11:
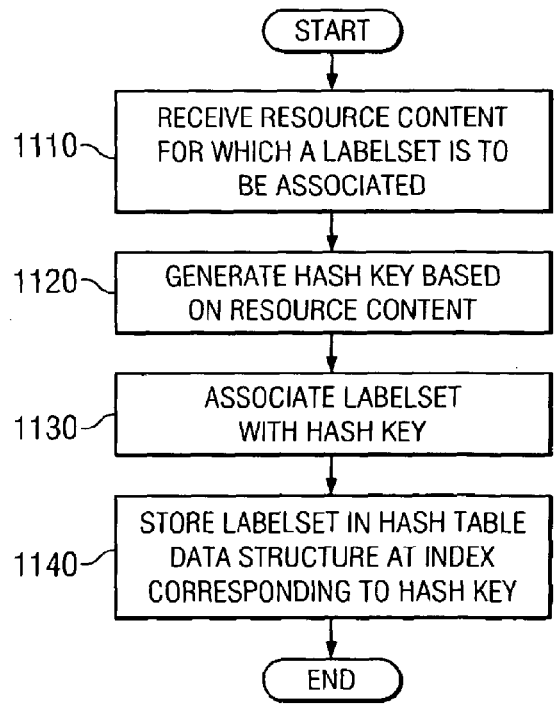
FIG. 11 is a flowchart outlining an exemplary operation for associating resources with labelsets in accordance with an illustrative embodiment.
Figure 12:
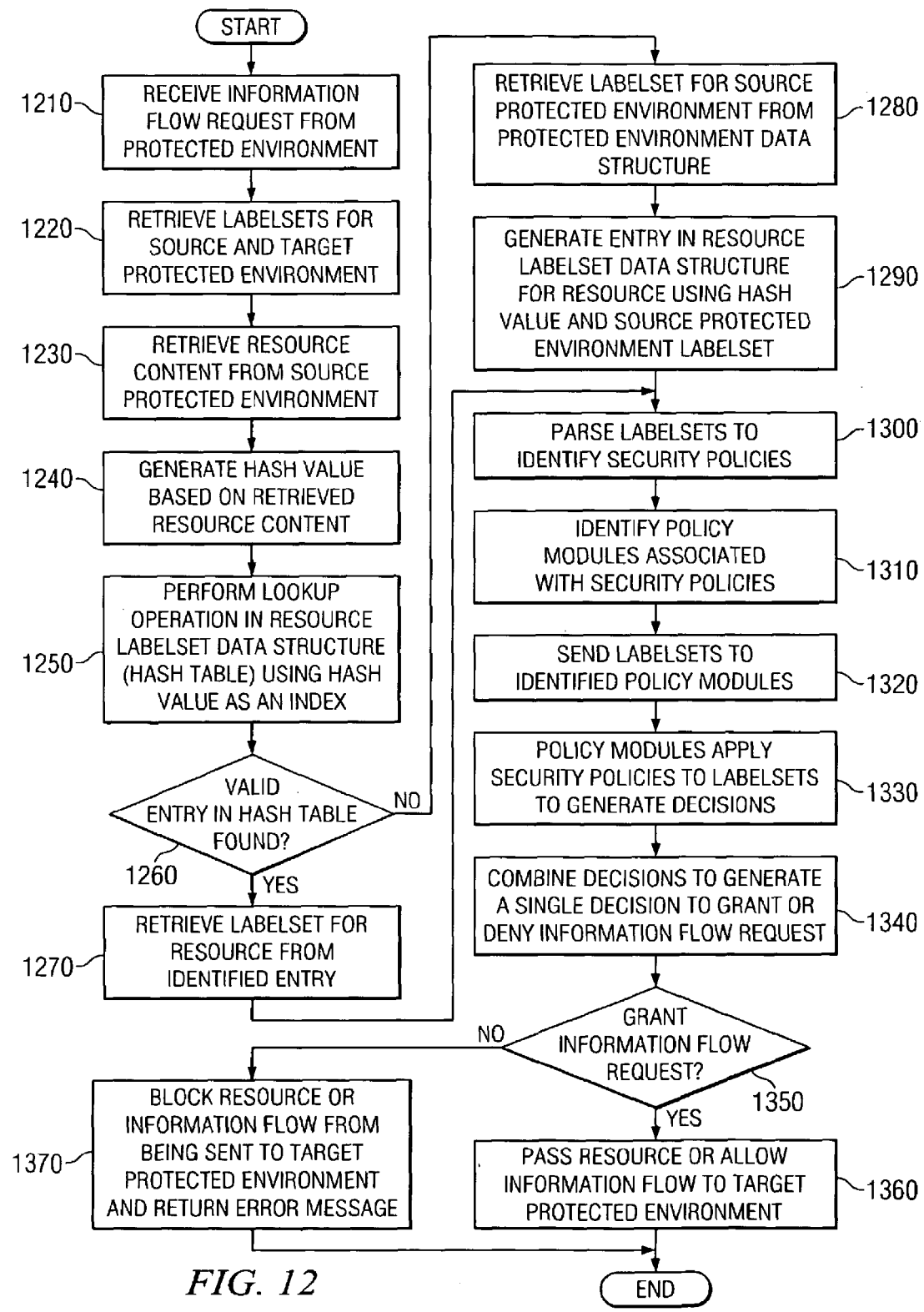
FIG. 12 is a flowchart outlining an exemplary operation for authenticating an information flow request in accordance with one illustrative embodiment.

FIGS. 10-12 are flowcharts outlining exemplary operations of an illustrative embodiment for associating labelsets with protected environments and resources and using such labelsets to perform authorization operations on information flow requests. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 10 is a flowchart outlining an exemplary operation for granting tokens to applications, devices, systems, etc. so as to establish a protected environment. While the operations shown in FIG. 10 may be used to authenticate and generate a protected environment for applications, devices, systems, and other sources of information flow requests, it will be assumed for simplification of this description, that the entity being authenticated is an application.

As shown in FIG. 10, the operation starts by the authenticator receiving an authentication assertion from an application (step 1010). The application is authenticated using any known authentication methodology, e.g., password authentication, security certificates, etc. (step 1020). The authenticator determines whether the application has been successfully authenticated or not (step 1030). If not, the authenticator does not issue a token to the application and returns an error message to the application (step 1040).

If the application has been successfully authenticated, the authenticator issues a token to the application (step 1050). The token is also provided to the reference monitor (step 1060) which uses the token to generate an appropriate labelset for the application in a protected environment data structure (step 1070). A security association is generated for the protected environment based on connection information and then stored in association with the generated labelset (step 1080). The operation then terminates.

FIG. 11 is a flowchart outlining an exemplary operation for associating resources with labelsets in accordance with an illustrative embodiment. As shown in FIG. 11, the operation starts by the reference monitor receiving resource content and security attributes for which a labelset is to be generated and associated (step 1110). The reference monitor generates a hash key by performing at least one hash function on the complete contents of the resource (step 1120). The reference monitor generates a labelset from the security attributes provided and associates the labelset for the resource with the generated hash key (step 1130) and stores the labelset in a hash table data structure at an index corresponding to the hash key (step 1140). The operation then terminates.

FIG. 12 is a flowchart outlining an exemplary operation for authenticating an information flow request in accordance with one illustrative embodiment. As shown in FIG. 12, the operation starts with the reference monitor receiving an information flow request from a protected environment (step 1210). The reference monitor retrieves the labelset for the source and target protected environment from the protected environment data structure based on the security association generated for the source protected environment and the name of the target protected environment passed with the information flow request (step 1220). The reference monitor retrieves the resource that is the subject of the information flow request from its source protected environment (step 1230). Optionally, if a single information transfer is being performed, the reference monitor may generate a hash value using at least one hash function on the complete contents of the retrieved resource (step 1240). The reference monitor may then optionally perform a lookup operation in a resource labelset data structure using the hash value as an index (step 1250).

The reference monitor may then optionally determine if a valid entry in the resource labelset data structure is identified at the index corresponding to the hash value (step 1260). If so, the reference monitor retrieves the labelset from the identified entry in the resource labelset data structure (step 1270). If not, the reference monitor retrieves the labelset for the source protected environment from the protected environment data structure (step 1280). The reference monitor then generates an entry in the resource labelset data structure at the index corresponding to the generated hash value and the labelset for the source protected environment is stored in this entry (step 1290).

It should be appreciated that steps 1230-1290 are performed if a single transfer of information is being performed, i.e. a resource is being transferred between the source protected environment and the target protected environment. In the case of a stream information flow, steps 1230-1290 may be skipped in the operation shown in FIG. 12.

The reference monitor parses the labelsets for the source and the target protected environment, and optionally the resource, to identify the security policies referenced in the labelsets (step 1300). The reference monitor identifies which policy modules correspond to the identified security policies (step 1310) and sends the labelsets to the identified policy modules (step 1320). The policy modules may optionally generate an effective labelset from the resource and source labelsets and then apply the security policies to the labelsets to generate decisions as to whether the information flow request should be granted or not (step 1330). A decision combinator combines the various decisions from the various policy modules into a single final decision as to whether the information flow request should be granted or not (step 1340).

The reference monitor determines whether the information flow request should be granted (step 1350). If so, the reference monitor passes the resource, or allows the information flow, to the target protected environment (step 1360). If not, the reference monitor blocks the passing of the resource, or the information flow, to the target protected environment and returns an error message to a submitter of the information flow request (step 1370). The operation then terminates.

Examples of Processing of Information Flow Requests

The following are examples of the processing of information flow requests. These examples are offered to show the various possible information flow processing operations that may be performed using the mechanisms of the illustrative embodiments described above. As mentioned above, there are two types of information flows that are handled by the mechanisms of the illustrative embodiment: information streams and resource transfers. First, examples of the processing of information stream requests will be discussed followed by a discussion of examples of the processing of resource information flow requests.

When attempting to open an information flow stream, a requesting entity in a protected environment may use the Information Flow Request Stream Open method to request the opening of an information flow stream between the requesting entity and the target entity. There are three scenarios that may be encountered in response to the Information Flow Request Stream Open method being invoked: (1) grant of an Information Flow Request Stream Open Request; (2) denial of an Information Flow Request Stream Open Request; and (3) grant of an Information Flow Request Stream Open Request with a Target Labelset Update. Each of these scenarios is describe below.

In a first scenario, a successful infoFlowRequestStreamOpen method invocation which grants a stream open with the reference monitor in verbose mode is described. In this example, a first protected environment (hereafter referred to as "partitions"), i.e. Partition 1, sends an infoFlowRequestStreamOpen request with the target partition name, Partition2, to the communication manager of the reference monitor. The communication manager of the reference monitor first calls cm_check_partiton_table( ) to ensure the source partition has an entry in a Partition table, which may be provided in Protected Environment Data Structure 540, for example. Next the communication manager (CM) of the reference monitor calls cm_get_target_security_association( ) to get the target partition's security association. A final check is made to ensure the stream does not already exists by calling cm_check_exisitng_open_stream( ).

After these checks complete, the CM makes a call to the information flow mediator (IFM) to request authorization to open a information flow stream by calling ifm_authorize_stream_open( ) with the source security association and target security association as parameters and waits for a response. The IFM first makes two separate internal calls to ifm_get_labelset( ) to get the associated labelset for both the source and target partitions. These labelsets are retrieved from the IFM Partition Labelset table, which may also be provided as part of the Protected Environment Data Structure 540, for example. Next, the IFM calls pf_auth_decision( ) to request an authorization decision from the policy framework. The policy framework returns a result code of SUCCESS and a major code of FLOW_GRANTED indicating that the flow is granted. A NULL is returned as the value for the new target labelset as a result of the pf_auth_decision( ) call. The IFM sends a success response to the CM indicating that the information flow is granted.

When the call completes successfully, a major reason code indicating that the flow is GRANTED is included in the response. The CM then adds the source and target security association pair to an Open Information Flow Streams table, which may be maintained in association with the CM, by calling cm_add_open_stream_entry( ) and sends a success message to Partition 1 indicating that the information flow is granted.

In a second scenario, a successful infoFlowRequestStreamOpen method invocation which denies a stream open is described. In this example, Partition 1 sends an infoFlowRequestStreamOpen request with the target partition name, Partition 3, to the CM. The CM then follows the same checks as in the sequence described above with regard to the first scenario.

After these checks complete, the CM then makes a call to the IFM to request authorization to open an information flow, as previously described. However in this scenario, the pf_auth_decision( ) returns a result code of SUCCESS and a major code of FLOW_DENIED indicating that the flow is denied. A NULL is returned as the value for the new target labelset indicating that no updates were made to the target labelset as a result of the pf_auth_decision( ) call.

When the call completes successfully, a major reason code indicating that the flow is DENIED is included in the response. The CM does not add the stream to the Open Information Flow Streams table because of the DENIED response from the IFM. Instead, the CM sends a success message to Partition 1 indicating that the information flow is denied.

In a third scenario, a successful infoFlowRequestStreamOpen method invocation which grants a stream open request that results in an update of the target partition's security attributes is described. In addition, the reference monitor is configured in verbose mode. In this example, Partition 4 sends an infoFlowRequeStreamOpen request with the target partition name, Partition 2, to the CM. The CM then follows the same checks as in the sequence describe previously with regard to the first scenario.

After these checks complete, the CM makes a call to the IFM to request authorization to open an information flow. The policy framework returns a result code of SUCCESS and a major code of FLOW_GRANT indicating that the information flow is granted. A new target labelset is also returned from the pf_auth_decision( ) call. The IFM then makes an internal call to ifm_update_partition_table( ) which updates the target partition entry with the new labelset returned from the pf_auth_decision( ). After the IFM Partition table is updated, the IFM sends a success response to the CM indicating that the information flow is granted and the target labelset was updated.

Now that the target partition labelset has been updated, the CM must close any open streams that reference Partition 2 by calling cm_close_existing_open_streams_target( ) and cm_close_existing_open_streams_source( ). Since an open stream exists from a source partition, Partition 1, to the target partition, Partiton 2, the CM notifies Partition1 of the closed stream by sending a reply message type within the call to cm_close_existing_open_streams_target( ). The CM then adds the new stream to the Open Information Flow Streams table by calling cm_add_open_stream_entry( ) and then sends a success message to Partition 4 indicating that the information flow is granted.

After having opened an information flow stream, the stream may need to be closed at a later time. The mechanisms of the illustrative embodiments provide a process for closing open streams. As an example, Partition 1 may send an infoFlowRequestStreamClose request with the target partition name, Partition 2, to the CM. The CM first calls cm_check_partition_table( ) to ensure the source partition has an entry in the Partition table. Next the CM calls cm_get_target_security_association( ) to get the target partition's security association. After these calls complete successfully, the CM calls cm_delete_existing_open_stream( ), which removes the stream from the Open Information Flow Streams table. The CM then sends a success message to Partition 1.

As mentioned above, in addition to providing functionality for information flow streams, the mechanisms of the illustrative embodiments also may process resource information flow requests in which a single transfer of a resource between a source protected environment, or partition, and a target protected environment is performed. As with the information flow streams discussed above, there are three scenarios of processing of an Information Flow Resource Request that are handled by the illustrative embodiments: (1) grant of an Information Flow Resource Request; (2) denial of an Information Flow Resource Request; and (3) grant of an Information Flow Resource Request with a Target Labelset Update. Each of these scenarios is describe below.

In a first scenario of the information flow resource request processing, a successful infoFlowRequestResource method invocation which sends a resource to the target partition with the reference monitor in verbose mode is described. In this example, Partition 1 sends an infoFlowRequestResource request with the target partition name, Partition 2, to the CM. The CM first calls cm_check_partition_table( ) to ensure the source partition has an entry in the Partition table. Next the CM calls cm_get_target_security_association( ) to get the target partition's security association.

After these checks complete successfully, the CM makes a call to the IFM to request authorization to send a information flow resource by calling ifm_authorize_resource_flow( ) with the resource, the source and target security associations as parameters, and waits for a response. The IFM makes two separate internal calls to ifm_get_labelset( ) to get the associated labelset for both the source and target partitions. These labelsets are retrieved from the IFM Partition Labelset table. The IFM then makes an internal call to ifm_get_resource_labelset( ) to get the labelset for the resource. The resource labelset is retrieved from the IFM Resource Labelset table, which may be provided as part of resource labelset data structure 550, for example.

The IFM then calls pf_auth_decision( ) to request an authorization decision from the policy framework. The policy framework returns a result code of SUCCESS and a major code of FLOW_GRANTED indicating that the flow is granted. A NULL is returned as a value for the new target labelset indicating that no updates were made to the target labelset as a result of the pf_auth_decision( ) call.

When the call completes successfully, a major reason code indicating that the flow is GRANTED is included in the response. The CM then calls cm_flow_information( ), which forwards the information to the target partition within a reply message type and sends a success message to Partition 1 indicating that the information flow is granted.

In a second scenario, a successful infoFlowRequestResource method invocation which denies a resource flow with the reference monitor in verbose mode is described. In this example, Partition 1 sends an infoFlowRequestResource request with the target partition name, Partition 3, to the CM. The CM then follows the same checks as in the sequence describe above with reference to the first scenario of the information flow resource request processing.

After these checks complete, the CM makes a call to the IFM to request authorization to send a resource information flow, in a similar manner as described above. In this scenario, however, the pf_auth_decision( ) returns a result code of SUCCESS and a major code of FLOW_DENIED indicating that the flow is denied. A NULL is returned as the value for the new target labelset indicating that no updates were made to the target labelset.

When the call completes successfully, a major reason code indicating that the flow is DENIED is included in the response. The CM does not forward the resource to the target partition because of the DENIED response from the IFM. Instead the CM sends a success message to Partition 1 indicating that the information flow is denied.

In a third scenario, a successful infoFlowRequestResource method invocation which grants a resource information flow request that results in an update of the target partition's security attributes. In addition, the reference monitor is configured in verbose mode. In this example, Partition 4 sends an infoFlowRequestResource request with the target partition name, Partition 2, to the CM. The CM then follows the same checks as in the sequence describe above with reference to the first scenario of the information flow resource request processing.

After these checks complete, the CM makes a call to the IFM to request authorization to send a resource information flow in a similar manner as previously described. In this scenario, however, the pf_auth_decision( ) method returns a result code of SUCCESS and a major code of FLOW_GRANTED indicating that the flow is granted. A new target labelset is also returned from the pf_auth_decision( ) call. The IFM then makes an internal call to ifm_update_partition_table( ), which updates the target partition entry with the new labelset returned from the pf_auth_decision( ). After the IFM Partition table is updated, the IFM sends a success response to the CM indicating that the information flow is granted and the target labelset was updated.

When the call completes successfully, a major reason code indicating that the flow is GRANTED with a minor reason code of TARGET_LS_UPDATED is included in the response.

Now that the target partition labelset has been updated, the CM must close any open streams that reference Partition 2 by calling cm_close_existing_open_streams_target( ) and cm_close_existing_open_streams_source( ). Since an open stream exists from source partition, Partition 1, to target partition, Partiton 2, the CM notifies Partition 1 of the closed stream by sending a reply message type within the call to cm_close_existing_open_streams_target( ). The CM then calls cm_flow_information( ), which forwards the information to the target partition within a reply message type and sends a success message to Partition 4 indicating that the information flow is granted.

With the above scenarios, the policy framework is called to perform an authorization decision and return a result of FLOW_GRANTED or FLOW_DENIED. In response to a pf_auth_decision( ) call, the policy framework first calls pf_check_registered_modules_table( ) to check that the source, resource and target labelsets each contain references to policy modules that are registered with the reference monitor instance. The policy framework then creates a temporary evaluation results table by calling pf_create_evaluation_results_table( ). This table temporarily stores the evaluation results generated by a given policy module and will be used by the decision combinator to produce a final authorization decision.

The policy framework then extracts individual policy module labelsets for the source, resource, and target labelsets by calling pf_extract_pm_labelsets( ). These extracted labelsets are sent to the appropriate policy module for evaluation.

The policy framework then calls pm_evaluate( ) so that a policy module will evaluate the extracted policy module labelsets for the source, resource, and target labelsets based on the policy and produce an evaluation result of GRANTED or DENIED, as well as a new target labelset if applicable. The pm first calls pm_get_effective_labelset( ) to get the effective labelset by combining the source and resource labelsets based on the policy module policy. Next, the policy module calls pm_evaluate( ) to request an authorization evaluation of the effective labelset and the target labelset. The PM returns a result code of SUCCESS and a major code of either FLOW_GRANTED or FLOW_DENIED based on the evaluation of the labelsets. A new target labelset may also be returned if applicable.

The policy module then calls pf_update_temp_evaluation_results_table( ) to store the individual evaluation results generated by a policy module for the source, resource, and target labelsets and corresponding new target labelsets (if applicable). If a policy module does not generate a new target labelset, it will return a NULL for the new target labelset.

Once all the appropriate policy modules have produced evaluation results and corresponding results have been stored, the policy framework calls pf_generate_final_auth_decision( ). In this call, the decision combinator evaluates the results stored in the evaluation results table against the combinator policy and produces a final authorization decision of GRANTED or DENIED. After the decision combinator returns the final result of GRANTED or DENIED and the new target labelset (if any) to the policy framework, the policy framework sends the final result to the IFM.

Comparison of Exemplary Aspects of the Illustrative Embodiments to Known Approaches The mechanisms of the illustrative embodiments differ from known approaches and methodologies in many respects, some of which will be discussed hereafter. Primarily, the benefits obtained from the use of the mechanisms of the illustrative embodiments are as follows. First, the labelsets are maintained completely within the reference monitor and thus, are not susceptible to unintentional or malicious alteration. Second, the labelsets provide a mechanism for eliminating the semantics of data manipulation from security considerations and allow security determinations to be performed based on sensitivities of the protected environments and resources involved in the information flow. As a result, source and target protected environments and resources may all make use of a common security attribute, i.e. the labelsets, for security policy evaluations, thereby reducing the complexity in the creation and use of security policies and rules.

Third, the labelsets also permit the use of set theory operations to perform security policy evaluations, thereby again simplifying the security policies and rules. Fourth, the labelsets may be associated with resources using a multidimensional hash data structure, thereby reducing the possibility of unintentional or malicious alteration of labelsets and reducing the possibility of hash collisions.

In addition, known systems require an intermediary device to perform transfers between one source of information to another source of information. For example, in a file transfer from one file server to another file server, an intermediary is typically required to request the file from a first file server and then to transmit the received file to the second file server. With the illustrative embodiments, because the mechanisms operate on information flows and are not concerned with the particular actions performed in information flow, file transfers may be made directly between the first and second file servers, assuming that they are authorized by security policies implemented by the reference monitor.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for authorizing information flows between devices of the data processing system, the method comprising:
    receiving a request for authorization of an information flow involving an information object from a first device to a second device;
    retrieving contents of the information object from the first device;
    generating a hash key based on the contents of the information object;
    performing a lookup operation in a hash table based on the hash key to identify a labelset associated with the information object;
    determining if an entry in the hash table at an index corresponding to the hash key identifies a labelset for the information object;
    storing a labelset, identifying a sensitivity of the information object, in the entry at the index corresponding to the hash key for the information object if a labelset for the information object is not identified in the entry in the hash table;
    performing at least one set theory operation on the labelset associated with the information object, a labelset associated with the first device, and a labelset associated with the second device; and
    authorizing the information flow based on the at least one set theory operation.

2. The method of claim 1, wherein the hash table is a multidimensional hash table and the hash key comprises a plurality of hash keys generated by a plurality of hash functions, at least one hash function and hash key for each dimension of the multidimensional hash table.

3. The method of claim 1, wherein the hash table is stored in a trusted computing base which is separate from a source of the information object.

4. The method of claim 1, wherein storing a labelset, identifying a sensitivity of the information object, in the entry at the index corresponding to the hash key for the information object comprises storing a labelset associated with a source of the information object in the entry in association with the information object.

5. The method of claim 1, wherein the labelset comprises a labellist element providing one or more labels of the labelset.

6. The method of claim 5, wherein the labels in the labellist are composed of a policy type and a value, wherein the policy type identifies a security policy to be applied to the labelset and the value identifies a value to be used in evaluating the security policy identified by the policy type.

7. The method of claim 5, wherein each labelset further comprises a version element indicating a version of the labelset and a count element indicating a number of labels included in the labelset.

8. The method of claim 1, wherein the hash key is generated using at least one hash function on content of the information object.

9. The method of claim 1, wherein the information object is a computer file.

10. A non-transitory computer program product comprising a computer readable storage medium including a computer readable program, wherein the computer readable program, when executed on a computing device, causes the computing device to:
    receive a request for authorization of an information flow involving an information object from a first device to a second device;
    retrieve contents of the information object from the first device;
    generate a hash key based on the contents of the information object;
    perform a lookup operation in a hash table based on the hash key to identify a labelset associated with the information object;
    determine if an entry in the hash table at an index corresponding to the hash key identifies a labelset for the information object;
    store a labelset, identifying a sensitivity of the information object, in the entry at the index corresponding to the hash key for the information object if a labelset for the information object is not identified in the entry in the hash table;

perform at least one set theory operation on the labelset associated with the information object, a labelset associated with the first device, and a labelset associated with the second device; and authorize the information flow based on the at least one set theory operation.

11. The computer program product of claim 10, wherein the hash table is stored in a trusted computing base which is separate from a source of the information object.

12. The computer program product of claim 10, wherein the computer readable program causes the computing device to store a labelset in the entry at the index corresponding to the hash key for the information object by storing a labelset associated with a source of the information object in the entry in association with the information object.

13. The computer program product of claim 10, wherein the hash table is a multidimensional hash table and the hash key comprises a plurality of hash keys generated by a plurality of hash functions, at least one hash function and hash key for each dimension of the multidimensional hash table.

14. The computer program product of claim 10, wherein the hash key is generated using at least one hash function on content of the information object.

15. The computer program product of claim 10, wherein the information object is a computer file.

16. The computer program product of claim 10, wherein the labelset comprises a labellist element providing one or more labels of the labelset.

17. The computer program product of claim 10, wherein the labels in the labellist are composed of a policy type and a value, wherein the policy type identifies a security policy to be applied to the labelset and the value identifies a value to be used in evaluating the security policy identified by the policy type.

18. The computer program product of claim 10, wherein each labelset further comprises a version element indicating a version of the labelset and a count element indicating a number of labels included in the labelset.

19. An apparatus for authorizing information flows between devices of the data processing system, the method comprising:

an information flow mediator; and a labelset storage device coupled to the information flow mediator, wherein the information flow mediator:

receives a request for authorization of an information flow involving the information object from a first device to a second device, retrieves contents of the information object from the first device, generates a hash key based on the contents of the information object, performs a lookup operation in a hash table stored in the labelset storage device based on the hash key to identify a labelset associated with the information object, determines if an entry in the hash table at an index corresponding to the hash key identifies a labelset for the information object, stores a labelset, identifying a sensitivity of the information object, in the entry at the index corresponding to the hash key for the information object if a labelset for the information object is not identified in the entry in the hash table, performs at least one set theory operation on the labelset associated with the information object, a labelset associated with the first device, and a labelset associated with the second device, and authorizes the information flow based on the at least one set theory operation.

20. The apparatus of claim 19, wherein the hash table is a multidimensional hash table and the hash key comprises a plurality of hash keys generated by a plurality of hash functions, at least one hash function and hash key for each dimension of the multidimensional hash table.

21. The apparatus of claim 19, wherein the hash table is stored in a trusted computing base which is separate from a source of the information object.

22. The apparatus of claim 19, wherein the information flow mediator stores a labelset in the entry at the index corresponding to the hash key for the information object by storing a labelset associated with a source of the information object in the entry in association with the information object.

23. A data processing system for authorizing information flows between devices, comprising:

a first computing device in a first partition of the data processing system, wherein the first computing device has a source element for communicating information to a target element;

a second computing device in a second partition of the data processing system, wherein the second computing device has the target element; and a reference monitor, coupled to the first computing device and the second computing device, that monitors information flows between the first partition and the second partition, wherein the reference monitor:

receives a request for authorization of an information flow involving the information object from a first device to a second device, retrieves contents of the information object from the first device, generates a hash key based on the contents of the information object, performs a lookup operation in a hash table based on the hash key to identify a labelset associated with the information object, determines if an entry in the hash table at an index corresponding to the hash key identifies a labelset for the information object, stores a labelset, identifying a sensitivity of the information object, in the entry at the index corresponding to the hash key for the information object if a labelset for the information object is not identified in the entry in the hash table, performs at least one set theory ration on the labelset associated with the information object, a labelset associated with the first device, and a labelset associated with the second device, and authorizes the information flow based on the at least one set theory operation.

24. The data processing system of claim 23, wherein the reference monitor comprises:

a communication manager having a listener for listening for information flow requests from elements of the data processing system;

an information flow mediator coupled to the communication manager for determining whether an information flow is to be authorized or denied;

a security data structure storage device coupled to the information flow mediator that stores security information for elements of the data processing system; and a security policy framework coupled to the information flow mediator for applying one or more security policies to security information for elements of the data processing system.

25. A computing device, comprising:

a processor; and a memory, wherein the memory contains instructions which, when executed by the processor, cause the processor to:

receive a request for authorization of an information flow involving the information object from a first device to a second device;

retrieve contents of the information object from the first device;

generate a hash key based on the contents of the information object;

perform a lookup operation in a hash table based on the hash key to identify a labelset associated with the information object;

determine if an entry in the hash table at an index corresponding to the hash key identifies a labelset for the information object;

store a labelset, identifying a sensitivity of the information object, in the entry at the index corresponding to the hash key for the information object if a labelset for the information object is not identified in the entry in the hash table;

perform at least one set theory operation on the labelset associated with the information object, a labelset associated with the first device, and a labelset associated with the second device; and authorize the information flow based on the at least one set theory operation.

* * * * *